United States Patent
Goto et al.

(10) Patent No.: US 7,007,934 B2
(45) Date of Patent: Mar. 7, 2006

(54) FLUID-FILLED VIBRATION DAMPING DEVICE

(75) Inventors: Katsuhiro Goto, Inuyama (JP); Katsuhisa Yano, Inuyama (JP); Kazuhiko Kato, Komaki (JP); Akira Katagiri, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/188,243

(22) Filed: Jul. 1, 2002

(65) Prior Publication Data
US 2003/0001322 A1    Jan. 2, 2003

(30) Foreign Application Priority Data
Jul. 2, 2001    (JP)    ............................. 2001-201218
Dec. 14, 2001    (JP)    ............................. 2001-382248

(51) Int. Cl.
*F16F 5/00*    (2006.01)
(52) U.S. Cl. .................................. 267/140.13; 267/219
(58) Field of Classification Search ........... 267/140.11, 267/140.13, 141, 219
See application file for complete search history.

(56) References Cited

U.S. PATENT DOCUMENTS

| | | | |
|---|---|---|---|
| 2,744,718 A | 5/1956 | Markowski et al. | |
| 2,917,265 A | 12/1959 | Markowski | |
| 3,537,696 A | 11/1970 | Webster, Jr. | |
| 4,553,744 A | 11/1985 | Konishi et al. | |
| 4,650,168 A | 3/1987 | Andra et al. | |
| 4,679,778 A | 7/1987 | Tabata et al. | |
| 4,682,753 A | 7/1987 | Clark | |
| 4,750,719 A * | 6/1988 | Hartel ........................ | 267/219 |
| 4,756,515 A | 7/1988 | Kuroda et al. | |
| 4,757,982 A | 7/1988 | Andra et al. | |
| 4,834,350 A | 5/1989 | de fontenay | |
| 4,836,515 A | 6/1989 | Franz et al. | |
| 4,915,365 A | 4/1990 | Lee | |
| 4,974,819 A | 12/1990 | Reichard et al. | |
| 5,060,917 A * | 10/1991 | DuBos et al. .......... | 267/140.13 |
| 5,088,700 A | 2/1992 | Kanda et al. | |
| 5,094,433 A | 3/1992 | Dan et al. | |
| 5,143,358 A | 9/1992 | Hibi et al. | |
| 5,273,263 A * | 12/1993 | Freudenberg et al. .. | 267/140.14 |

(Continued)

FOREIGN PATENT DOCUMENTS

GB    2 122 718 A    1/1984

(Continued)

*Primary Examiner*—James McClellan
*Assistant Examiner*—Bradley King
(74) *Attorney, Agent, or Firm*—Beyer Weaver & Thomas LLP

(57) ABSTRACT

A fluid-filled vibration-damping device including an elastic body elastically connecting a first and a second mounting member, a pressure-receiving chamber disposed inward of and partially defined by the elastic body, and a flexible rubber layer disposed outwardly of and cooperating with the elastic body to form an equilibrium chamber held in fluid communication with the pressure-receiving chamber through a first orifice passage. The first mounting member includes an elastic-body central member and a rubber-layer central member, which are fixed together at their abutting surfaces by a fixing mechanism, to constitute the first mounting member, and positioned relative to each other by an engagement of a fitting recess and projection formed on their abutting surfaces. A peripheral portion of an interface between the abutting surfaces of the elastic-body central member and said rubber-layer central member entirely faces the equilibrium chamber and/or the pressure-receiving chamber.

13 Claims, 14 Drawing Sheets

U.S. PATENT DOCUMENTS

| | | |
|---|---|---|
| 5,628,498 A | 5/1997 | Nanno |
| 5,927,698 A * | 7/1999 | Miyoshi et al. .......... 267/140.13 |
| 6,068,246 A * | 5/2000 | Lee et al. ............... 267/140.11 |
| 6,250,615 B1 * | 6/2001 | Leibach ................. 267/140.13 |
| 6,390,459 B1 * | 5/2002 | Saitoh ................... 267/140.13 |
| 6,592,110 B1 * | 7/2003 | Takashima et al. ..... 267/140.13 |
| 6,598,865 B1 * | 7/2003 | Kato ..................... 267/140.13 |

FOREIGN PATENT DOCUMENTS

| | | |
|---|---|---|
| JP | 58-37337 | 3/1983 |
| JP | 61-274132 | 12/1986 |
| JP | 62-147139 | 7/1987 |
| JP | 6-33987 | 2/1994 |
| JP | 6-33228 | 8/1994 |
| JP | 6-288423 | 10/1994 |
| JP | 7-35188 | 2/1995 |
| JP | 8-291844 | 11/1996 |
| JP | 9-257090 | 9/1997 |
| JP | 10-38016 | 2/1998 |
| JP | 10-184767 | 7/1998 |
| JP | 2001-59540 | 3/2001 |

* cited by examiner

FLUID-FILLED VIBRATION DAMPING DEVICE

INCORPORATED BY REFERENCE

The disclosure of Japanese Patent Application No. 2001-201218 filed on Jul. 2, 2001 and No. 2001-382248 filed on Dec. 14, 2001, each including the specification, drawings and abstract, are incorporated herein by reference in their entirety.

BACKGROUND OF THE INVENTION

1. Field of the Invention

The present invention relates generally to fluid-filled vibration-damping devices exhibiting vibration damping effect on the basis of flows of non-compressible fluid filled therein. More particularly, the present invention is concerned with such a fluid-filled vibration-damping device that is novel in construction, and that is capable of providing an improved fluid-tight sealing without deteriorating efficiency in assembling and manufacturing the fluid-filled vibration-damping device.

2. Description of the Related Art

A fluid-filled vibration-damping device is known as one type of a vibration damping device interposed between two members of a vibration system for elastically connecting the two members, or for mounting one of the two members of the vibration system on the other member in a vibration damping fashion. JP-A-8-291844, JP-A-2001-59540 and JP-A-10-38016 disclose known examples of such a fluid-filled vibration-damping device, which includes a first mounting member adapted to be attached to one of the two members of the vibration system, a second mounting member adapted to be attached to the other member of the vibration system, and a rubber elastic body that is bonded at its central portion to the first mounting member and at its outer circumferential portion to the second mounting member for elastically connecting the first and second mounting members. The rubber elastic body partially defines a pressure-receiving chamber on one of opposite-side thereof. The pressure-receiving chamber is filled with the non-compressible fluid and adapted to receive vibrational load applied to the fluid-filled vibration-damping device. On the other side of the rubber elastic body, a flexible diaphragm formed of a rubber material is disposed so as to extend between the first and second mounting members, whereby the rubber elastic body and the flexible diaphragm cooperate to define therebetween an equilibrium chamber partially defined by the flexible diaphragm. The equilibrium chamber is filled with the non-compressible fluid, and has a volume that is variable due to deformation of the flexible diaphragm. The fluid-filled vibration-damping device further includes an first orifice passage for a fluid communication between the pressure-receiving chamber and the equilibrium chamber.

For the sake of efficiency in manufacture, the known fluid-filled vibration-damping device as disclosed in the aforesaid publication documents is arranged such that the rubber elastic body and the flexible diaphragm are formed independently from each other, and the rubber elastic body is bonded at its central portion to a central metal member for the rubber elastic body (hereinafter referred to as an "elastic-body central metal member"), while the flexible diaphragm is bonded at its central portion to a central metal member for the flexible diaphragm (hereinafter referred to as a "diaphragm central metal member"). These elastic-body and diaphragm central metal members are superposed on and fixed to each other, thereby providing the first mounting member.

However, as shown in the aforementioned JP-A-2001-59540 and JP-A-10-38016, for example, the conventional fluid-filled vibration-damping device is likely to suffer from a problem of leakage of the fluid originated in its structural feature. Namely, the elastic-body central metal member is provided with a fixing bolt protruding therefrom at which the first mounting member is fixed to one of the two members connected together in the vibration-damping fashion. On the other hand, the diaphragm central metal member is provided with a through hole formed through its central portion. These elastic-body and diaphragm central metal members are superposed on each other with the fixing bolt of the elastic body central metal member extending through the through hole of the diaphragm central portion. Consequently, an interface between the elastic-body central metal member and the diaphragm central metal member are substantially directly exposed to the atmosphere at the through hole portion of the diaphragm central metal member. Since an outer peripheral portion of the interface between the elastic-body central metal member and the diaphragm central metal member faces to the equilibrium chamber, the non-compressible fluid filling the equilibrium chamber is likely to be leaked out through the interface and the through hole of the diaphragm central metal member. In this respect, it should be noted that the fluid-filled vibration-damping device disclosed in the above described JP-A-8-291844 also suffers from the same inherent problem, although a clear depiction of the through hole formed through the diaphragm central metal member is just omitted.

In the conventional fluid-filled vibration-damping devices shown in the above-described publication documents, moreover, the elastic-body central metal member and the diaphragm central metal member are just superposed on each other at their plane abutting surfaces, in order to constitute the first mounting member. This arrangement makes it difficult to precisely position the two central metal members relative to each other upon assembling these two members together, and may possibly cause displacement of the two central metal members relative to each other, leading to undesirable leakage of the non-compressible fluid through the interface between abutting surfaces of the two central metal members.

Also, the diaphragm central metal member is not directly fixed to the elastic-body central metal member, but is just gripped by and between the elastic-body central metal member and the one member of the two members connected together in the vibration damping fashion, to which the elastic-body central metal member is bolted. This conventional structure is likely to cause looseness between the elastic-body central metal member and the diaphragm central metal member due to an effect of the vibrations applied thereto, resulting in difficulty in assuring a high fluid-tight sealing at the interface between the two central metal members with high stability.

JP-A-9-257090 discloses an example of modification of the above-described fluid-filled vibration-damping device proposed in an attempt to cope with the above-described conventional problem, in which the elastic body and the flexible diaphragm are formed as components of an integral vulcanized products. However, it is difficult in view of the shape or structure of a mold for forming the integral vulcanized product including the elastic body and the flexible diaphragm as the components. Further, such an integral vulcanized product makes it impossible to select suitable materials for the elastic body and the flexible diaphragm, respectively, in the light of required characteristics of the respective ones. For the above reasons, the proposed modification is not sufficient to solve the conventional problem.

SUMMARY OF THE INVENTION

It is therefore one object of this invention to provide a fluid-filled vibration-damping device novel in construction and capable of establishing an excellent fluid-tight sealing its chambers fluid with a non-compressible fluid with simple structure.

The above and/or other objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A fluid-filled vibration-damping device for connecting two members in a vibration damping fashion, comprising: (a) a first mounting member connectable to one of the two members; (b) a second mounting member connectable to an other of the two member; (c) an elastic body bonded at an central portion thereof to the first mounting member and at an outer circumferential portion thereof to the second mounting member in a process of vulcanization of a rubber material for forming the elastic body, for elastically connecting the first and second mounting members; (d) a pressure-receiving chamber disposed on one of axially opposite sides of the elastic body, filled with a non-compressible fluid and partially defined by the elastic body, to which a vibrational load is applied; (e) a flexible rubber layer disposed on an other one of axially opposite side of the elastic body so as to form an equilibrium chamber between the flexible rubber layer and the elastic body, the equilibrium chamber being filled with the non-compressible fluid and partially defined by the flexible rubber layer so as to easily permit a volumetric change thereof; and (f) a first orifice passage for fluid communication between the pressure-receiving chamber and the equilibrium chamber. The first mounting member includes an elastic-body central member bonded to the central portion of the elastic body, and a rubber-layer central member bonded to a central portion of the flexible rubber layer and having a fixing portion at which the first mounting member is connected to the one of the two member, and the elastic-body central member and the rubber-layer central member are superposed on and fixed to each other at their abutting surfaces by means of a fixing mechanism, to thereby constitute the first mounting member. One of the elastic-body central member and the rubber-layer central member has a fitting recess open in the abutting surface thereof, and an other one of the elastic-body central member and the rubber-layer central member has a fitting protrusion formed on the abutting surface thereof and being fitted into the fitting recess so that the elastic-body central member and the rubber-layer central member are positioned relative to each other, and a peripheral portion of an interface between the abutting surfaces of the elastic-body central member and the rubber-layer central member entirely faces the equilibrium chamber and/or the pressure-receiving chamber.

In the fluid-filled vibration-damping device according to this mode of the invention, the peripheral portion of the interface between the abutting surfaces of the elastic-body and rubber-layer central members entirely faces to the equilibrium chamber and/or the pressure-receiving chamber, without being exposed to the external area or the atmosphere, thus preventing undesirable leakage of the non-compressible fluid through the interface between these central members. Therefore, the fluid-filled vibration-damping device of this mode of the invention is capable of securing a high fluid-tight sealing of the fluid chambers filled with the non-compressible fluid.

Also, the use of the fitting mechanism established the fitting recess and the fitting projection enables to position the elastic-body central member and the rubber-layer central member relative to each other with ease and preciseness, thus achieving improvement both in production efficiency and product quality. Moreover, the use of the combination of the fitting recess and the fitting projection prevents the engagement of the elastic-body central member and the rubber-layer central member loosing, thus establishing the high fluid-tight sealing of the chambers filled with the non-compressible fluid for a long period of time.

The fixing portion of the rubber-layer central member may have a variety of forms including a bolt or a threaded nut. The fixing mechanism for fixing the elastic-body and the rubber-layer central members together may be selected from known fixing mechanism established by pressing and by calking, and other possible fixing structures, e.g., a bolt or the like.

(2) A fluid-filled vibration-damping device according to the above mode (1), wherein the fitting recess has an inner circumferential surface with a tapered shape that corresponds to a tapered shape of an outer circumferential surface of the fitting protrusion. The fluid-filled vibration-damping device according to this mode of the invention permits an improved efficiency in assembling the elastic-body central member and the rubber-layer central member together, since these tapered surfaces function as a guide.

(3) A fluid-filled vibration-damping device according to the above-indicated mode (2), wherein the fitting recess includes a press-fitting hole formed in a bottom wall thereof so as to axially extend with a substantially constant inner diameter, while the fitting protrusion includes a press-fitting part integrally formed at a protruding end portion thereof, the press-fitting part being press-fitted into the press-fitting hole to thereby provide the fixing mechanism. According to this mode of the invention, the fixing mechanism can be embodied with simple structure. The press-fitting part may be provided with a cutout portion as needed, in order to reduce the weight thereof or alternatively to reduce a press-fitting force that is applied by the press-fitting part to the press-fitting hole upon the press-fitting. The press-fitting hole may be a recess or alternatively be a bore extending through the bottom wall of the fitting recess.

(4) A fluid-filled vibration-damping device according to any one of the above-indicated modes (1)–(3), wherein the elastic-body central member includes a fixing bore open in the abutting surface thereof and extending therethrough in a direction in which the elastic-body central member and the rubber-layer central member are superposed on each other, while the rubber-layer central member includes a fixing shaft protruding therefrom, the fixing shaft extending through the fixing bore and disengageably fixed at a tip end thereof to the elastic-body central member, to thereby provide the fixing mechanism. This arrangement enables the elastic-body central member and the rubber-layer central member to be firmly engaged together, thereby exhibiting a strong force resistive to an axial force that causes disengagement of the elastic-body and rubber-layer central members. The fixing bore and the fixing shaft may be constituted by the press-fitting hole and the press-fitting part constructed according to the above-indicated mode (3). The fixing shaft may be formed as an integral part of the rubber-layer central member, or may be formed independently of and bonded to the rubber-layer central member by means of known fastening members, e.g., screws or the like. Further, a variety of methods are adoptable for disengageably fixing the fixing shaft to the fixing bore. For instance, the fixing shaft is disengageably fixed to the fixing bore such that a tip end portion of the fixing shaft is calked against the open-end portion of the fixing bore, or alternatively such that the tip end of the fixing shaft is provided with a bolt or rivet that is fitting on the open-end portion of the fixing bore.

(5) A fluid-filled vibration-damping device according to any one of the above-indicated modes (1)–(4), further comprising: an elastic-body outer sleeve member bonded to an outer circumferential portion of the elastic body; and a rubber layer outer sleeve member bonded to an outer circumferential portion of the flexible rubber layer, wherein the elastic-body and rubber-layer outer sleeve members are fixed together to constitute the second mounting member, and cooperate with each other to at least partially define the first orifice passage therebetween. This arrangement makes it possible to form the first orifice passage that is simple in construction with a reduced number of components, resulting in improved efficiency and reduced cost of manufacture of the orifice member. These outer sleeve members may be formed of metallic or synthetic resin members having cylindrical or circumferential wall portions utilized to define the first orifice passage.

(6) A fluid-filled vibration-damping device according to any one of the above-indicated modes (1)–(5), further comprising a narrow passage adapted to connect the interface between the abutting surfaces of the elastic-body central member and the rubber-layer central member to at least one of the equilibrium chamber and the pressure-receiving chamber. In the fluid-filled vibration-damping device according to this mode of the invention, the narrow passage may be utilized to suction an air undesirably remained within the equilibrium chamber and/or the pressure-receiving chamber, upon assembling the elastic-body central member and the rubber-layer central member together Thus, the fluid-filled vibration-damping device can exhibit an improved stability in terms of its quality and capability (7) A fluid-filled vibration-damping device according to any one of the above-indicated modes (1)–(6), wherein the first mounting member includes an injection bore extending through the elastic-body and rubber-layer central members in a direction in which the central members are superposed on each other, and an opening of the injection bore is fluid-tightly closed by a sealing member after filling the device with the non-compressible fluid through the injection bore. In the fluid-filled vibration-damping device according to this mode of the invention, the injection bore may be utilized to perform a known vacuum suction method for filling the pressure-receiving chamber and the equilibrium chamber with the non-compressible fluid. More specifically, the pressure-receiving and the equilibrium chambers are vacuumed through the injection bore, and then filled with the non-compressible fluid through the injection bore instantly, ensuring an easy and rapid filling operation. Also, the opening of the injection bore is fluid-tightly closed or sealed by means of a suitably sealing member after the termination of the process to fill the equilibrium and pressure-receiving chamber with the non-compressible fluid, thus eliminating a problem of leakage of the non-compressible fluid through the injection bore. That is, the fluid-filled vibration-damping device of this mode of the invention permits both of the desired high fluid-tight sealing of the device and an improved efficiency in the process of filling the pressure-receiving chamber and the equilibrium chamber with the non-compressible fluid. A known blind rivet or the like may be preferably employed as the sealing member adapted to fluid-tightly close the opening of the injection bore.

(8) A fluid-filled vibration-damping device according to any one of the above-indicated modes (1)–(7), further comprising: a heat shielding sleeve disposed radially outwardly of the flexible rubber layer and fixed at one of axially opposite end portion thereof to the second mounting member, wherein an other one of axially opposite end portion of the heat shielding sleeve extends radially inwardly so as to provide a stop portion that is opposed to the first mounting member with a given spacing in an axial direction of the device and/or a radial direction perpendicular to the axial direction, and the stop portion is brought into abutting contact with the first mounting member via a buffer so as to limit an amount of displacement of the first and second mounting members relative to each other.

It should be noted that the flexible rubber layer, which is a thin-walled member having a low strength and a great amount of deformation, is disposed radially outward of the elastic body and located in the outermost portion of the fluid-filled vibration-damping device. The flexible rubber layer may possibly be damaged due to undesirable contacts with other components and be affected by heat emitted from the internal engine mount or the like, JP-A-10-38016 discloses a technique to cope with this problem, in which the flexible rubber layer is formed of a heat resistive rubber material different from the material of the elastic body. The proposed technique undesirably limits materials of the flexible rubber layer in view of its heat resistance, resulting in insufficient properties of the flexible rubber layer in terms of corrosion resistance, ozone resistance, physical strength and the like. However, the heat shielding sleeve is disposed radially outwardly of the flexible rubber layer and substantially entirely covers the flexible rubber layer in this mode of the invention. Therefore, the flexible rubber layer is effectively prevented from possible damages due to the contact with the other components, and possible deterioration caused by the heat emitted from an internal combustion engine or the like. This arrangement leading to an enhanced degree of freedom in selecting materials of the elastic body and the flexible rubber layer as well, thus ensuring desired durability and properties of the flexible rubber layer in terms of ozone, chemical and heat resistances. Also, the thin-walled flexible rubber layer is likely to transmit heat emitted from the outside to the fluid filled within equilibrium chamber, possibly leading to undesirable change in the viscosity of the fluid and gas separation occurred within the fluid, resulting in deterioration of the damping characteristics of the vibration damping device. The use of the heat shielding sleeve is able to eliminate this inherent problem in the fluid-filled vibration-damping device where the flexible rubber layer is disposed in the outermost position of the device.

In addition, the heat shielding sleeve also functions to constitute a stop mechanism in cooperation with the first mounting member in order to limit an amount of displacement of the first and second mounting member relative to each other in a shock absorbing manner. That is, the present mode (8) of the invention makes it possible to provide not only the heat shielding mechanism but also the stop mechanism as well with simple structure in a fluid-filled vibration-damping device having a unique structure in which the equilibrium chamber is disposed on the axially outward of the elastic body.

The stop portion of the heat shielding sleeve may be used to constitute a stop mechanism arranged to limit an amount of displacement of the first and second mounting members relative to each other in one or both of opposite axial directions of these mounting members. Alternatively, the stop mechanism may be arranged to limit an amount of displacement of the first and second mounting members relative to each other in a direction perpendicular to the axial direction, instead of or in addition to the axial direction. For instance, the first mounting member is integrally or fixedly provided with a recess open in its outer circumferential surface with a rectangular shape in its cross section, and the stop member of the heat shielding sleeve is disposed within the recess, so that the stop member is opposed to the inner surface of the recess in both of the axial and radial directions of the first and second mounting members via a suitable buffer. As a result, the stop member and the recess cooperate to form a multi-directional stop mechanism capable of limiting the displacement of the first and second mounting members in various directions with a simple structure and reduced numbers of components.

(9) A fluid-filled vibration-damping device according to the above-indicated mode (8), further comprising: an elastic-body outer sleeve member bonded to an outer circumferential portion of the elastic body; and a rubber-layer outer sleeve member bonded to an outer circumferential portion of the flexible rubber layer, the elastic-body and rubber-layer outer sleeve members being fixed together to partially constitute the second mounting member, wherein the rubber-layer central member extends radially outwardly from the elastic-body central member so as to provide an abutting portion that is brought into abutting contact with the stop portion of the heat shielding sleeve in the axial direction of the device, and the flexible rubber layer is bonded at the central portion thereof to the abutting portion of the rubber-layer central member, while the one of axially opposite end portion of the heat shielding sleeve is mounted on an outer circumferential surface of the rubber-layer outer sleeve member, and is fixed to the second mounting member by calking. In this arrangement, the rubber-layer central member is effectively utilized to provide the abutting portion with which the stop portion of the heat shielding sleeve is brought into contact, while avoiding undesirable enlargement of the first mounting member. Further, the flexible rubber layer is formed independently of the elastic body, thereby enhancing a degree of freedom in selecting materials of the elastic body and the flexible rubber layer.

(10) A fluid-filled vibration-damping device according to the above-indicated mode (9), further comprising a sealing rubber integrally formed at an outer peripheral portion of the flexible rubber layer over an entire circumference thereof so as to prevent entry of water into an interface between the heat shielding sleeve and the rubber-layer outer sleeve member. This arrangement is effective to prevent undesirable entry of water or other objects into the interference between the rubber-layer outer sleeve member and the heat shielding sleeve, thereby effectively preventing undesirable rust of these sleeve members. Preferably, the heat shielding sleeve may be provided with a drain hole located adjacent to the sealing portion between the heat shielding sleeve and the rubber-layer outer sleeve member in order to promptly drain water or other objects gathered at the sealing portion.

(11) A fluid-filled vibration-damping device according to any one of the above-indicated modes (8)–(10), wherein the second mounting member has a tapered cylindrical portion formed at one of axially opposite end portion thereof and extending axially outwardly and radially outwardly, and the outer circumferential portion of the elastic body is bonded to the tapered cylindrical portion, and wherein the tapered cylindrical portion is provided with a cutout, while the elastic body is provided with a guide groove formed at a first circumferential position thereof so as to be contiguous with the cutout and so as to extend to the equilibrium chamber so that the cutout and the guide groove cooperate to connect the first orifice passage to the equilibrium chamber.

This arrangement permits the elastic body to be supported at its outer circumferential portion by the tapered cylindrical portion, so that the elastic body can exhibit an approximately linear spring characteristics with stability with respect to a compressive load in the axial direction. Moreover, the axially lower side of the tapered cylindrical portion that is remote from the elastic body may be effectively utilized to provide the first orifice passage with high space utilization. The guide groove may be formed on the outer circumferential surface of the elastic body with various shapes so as to extend in various directions. For instance, the guide groove is formed on the outer circumferential surface of the elastic body so as to extend in the axial direction.

(12) A fluid-filled vibration-damping device according to the above-indicated mode (11), wherein the guide groove has a slope-like shape in which a depth dimension gradually decreases with an increase of a distance from the cutout. This arrangement facilitates smooth flows of the non-compressible fluid through the guide groove from the equilibrium chamber to the first orifice passage, whereby the vibration-damping device can exhibit a damping effect on the basis of the flows of the fluid in an effective manner.

The guide groove may extends on the outer circumferential surface of the elastic body in the axial direction, or alternatively in the circumferential direction. In the latter case, the guide groove functions to guide the fluid to flow in the direction approximate to a direction in which the fluid flows through the first orifice passage, and to elongate the guide groove, resulting in further improved smoothness of the flows of the fluid through the first orifice passage and the equilibrium chamber.

(13) A fluid-filled vibration-damping device according to the above-indicated mode (12) wherein the elastic body further includes a volume balancing portion formed at a second circumferential position thereof so that a volume of the elastic body is well balanced about a central axis of the elastic body. The volume balancing portion of this mode of the invention makes it possible to well balance the volume of the elastic body about its central axis, thus preventing that the damping or supporting capability of the vibration-damping device is adversely effected or deteriorated by the guide groove formed on the elastic body. This arrangement permits a desired spring characteristics of the elastic body with respect to a static and active load in a stable manner, and eliminates stress concentration at a portion in which the guide groove is formed, resulting in improved durability of the elastic body.

The volume balancing portion may have a variety forms. For instance, the volume balancing portion may be a cutout formed at the second circumferential position that is symmetrical to the first circumferential position with respect to the central axis of the elastic body, or alternatively may be a boss formed on an inner circumferential surface of the elastic body at a circumferential position corresponding to that of the guide groove.

(14) A fluid-filled vibration-damping device according to any one of the above-indicated modes (1)–(14), further comprising: a movable member partially defining the pressure-receiving chamber and being elastically supported by the second mounting member so as to be displaceable relative to the second mounting member; and an oscillating mechanism adapted to apply an oscillating force to the oscillating member in order to actively induce a fluid-pressure variation in the pressure-receiving chamber. That is, the movable member and the oscillating force cooperate each other to provide the oscillating mechanism in the present embodiment. According to this mode of the invention, an active-type fluid-filled vibration-damping device may be embodied, in which the fluid-pressure variation induced in the pressure-receiving chamber upon application of vibrational loads to the pressure-receiving chamber can be actively compensated or reduced by the oscillating force generated by the oscillating member.

In the case where the first orifice passage is disposed outside of the pressure-receiving chamber, the pressure-receiving chamber is allowed to have a relatively large volume and the movable member can face to the pressure-receiving chamber with a relatively large surface area. Therefore, such a movable member can generate a relatively large amount of fluid-pressure variation in the pressure-receiving chamber by a relatively small amount of displacement thereof. Meanwhile, the oscillating mechanism may be selected from a pneumatic-type, an electrostrictive-type and a magnetostrictive-type actuator as well as an electrostrictive-type actuator, by way of example.

Preferably, the pressure-receiving chamber is divided by a partition member into a primary fluid chamber partially defined by the elastic body and an auxiliary fluid chamber partially defined by the movable member, and these primary and auxiliary fluid chambers are held in fluid communication through a second orifice passage. In this arrangement, fluid-pressure variation induced in the auxiliary fluid chamber by the oscillation of the movable member is efficiently transmitted to the pressure-receiving chamber with the help of resonance of the fluid flowing through the second orifice passage. As a result, the fluid-filled vibration-damping device of this arrangement can exhibit an active damping effect in an effective manner, with respect to vibrations whose frequency is held within a frequency range to which the second orifice passage is tuned.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
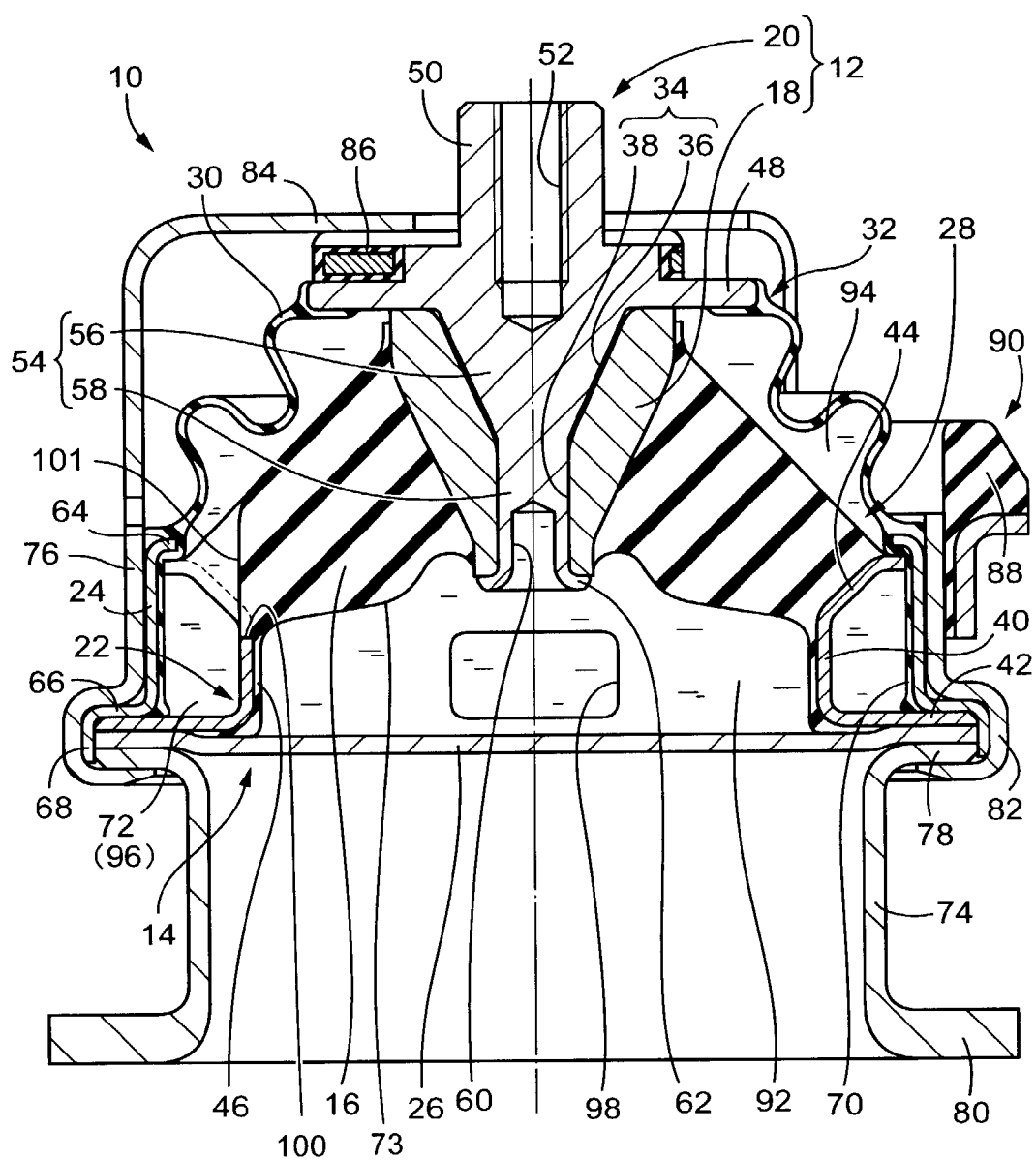
FIG. 1 is an elevational view in vertical or axial cross section of a fluid-filled vibration-damping device in the form of an engine mount constructed according to a first embodiment of the present invention.

Referring first to FIG. 1, an engine mount 10 for use in an automotive vehicle is shown as a first embodiment of a fluid-filled vibration-damping device of the present invention. This engine mount 10 includes a first mounting member 12 and a second mounting member 14, which are made of suitable metallic materials. These first and second mounting members 12, 14 are elastically connected to each other by an elastic body 16 interposed therebetween. The first mounting member 12 is adapted to be attached to a power unit of the vehicle, while the second mounting member 14 is adapted to be attached to a body of the vehicle, so that the power unit is mounted on the vehicle body in a vibration damping fashion. With the engine mount 10 installed on the vehicle as described above, a static load or weight of the power unit and a primary vibrational load act between the first and second mounting members in an approximately axial direction of the engine mount, that is generally parallel to the vertical direction as seen in FIG. 1. In the following description, the vertical direction is basically oriented in the vertical direction as seen in FIG. 1.

Described in detail, the first mounting member 12 includes an elastic-body central member in the form of an elastic-body inner metal member 18 and a rubber-layer central member in the form of a diaphragm inner metal member 20, while the second mounting member 14 includes an elastic-body outer sleeve member in the form of an elastic-body outer-cylindrical metal member 22 and a rubber-layer outer sleeve member in the form of a diaphragm outer-cylindrical metal member 24 and a rid-metal-plate member 26. The elastic body 16 is bonded at its central portion to the elastic-body inner metal member 18 and at its outer circumferential portion to the elastic body outer-circumferential metal member 22 in the process of vulcanization of a rubber material to form the elastic body 16, thereby providing a first integral vulcanized product 28 (shown in FIG. 2). On the other hand, a flexible rubber layer in the form of a flexible diaphragm 30 is bonded at its central portion to the diaphragm inner metal member 20 and at its outer circumferential portion to the diaphragm outer-cylindrical metal member 24 in the process of vulcanization of a rubber material to form the flexible diaphragm 30, thereby providing a second integral vulcanized product 32 (shown in FIG. 3). These first and second integral vulcanized products 28, 32 are assembled together.

Referring back to FIG. 2, the elastic-body inner metal member 18 as one component of the first integral vulcanized product 28, has an inverted generally truncated conical shape, and is formed with a fixing bore 34 extending therethrough in its axial direction and open in its axially opposite ends, i.e., a large diameter end face and a small diameter end face. The axially upper end portion of the fixing bore 34 serves as a fitting recess in the form of a guide bore 36 having an inner surface with a mortar or tapered shape so that the guide bore 36 has a diameter gradually increasing toward the large diameter end face. The axially lower end portion of the guide bore 36 serves as a press-fitting hole in the form of a cylindrical fitting bore 38 extending axially downwardly with a generally constant inner diameter, to be open in the small diameter end face of the elastic-body central member.

The elastic-body outer-cylindrical metal member 22 includes a cylindrical wall portion 40 with a generally large diameter thin-walled cylindrical shape, a flange portion 42 integrally formed at an axially lower end portion of the cylindrical wall portion 40 so as to extend radially outwardly, and a tapered cylindrical portion 44 integrally formed at an axially upper end portion of the cylindrical wall portion 40. The diameter of the tapered cylindrical portion 44 gradually increases in the axially outward direction. The elastic-body outer-cylindrical metal member 22 constructed as described above thus provides a circumferential groove open in its outer circumferential surface. The elastic-body inner metal member 18 is disposed on the side of the tapered cylindrical portion 44 of the elastic-body outer-cylindrical metal member 22 with a given axial spacing therebetween, while being held in a generally concentric or coaxial relationship with the elastic-body outer-cylindrical metal member 22. In this state, the tapered outer circumferential surface of the elastic-body inner metal member 18 is spaced away from and opposed to the tapered cylindrical portion 44 of the elastic-body outer-cylindrical metal member 22 in the axial direction of the engine mount 10, and these opposed surfaces of the elastic-body inner metal member 18 and the tapered cylindrical portion 44 are elastically connected with each other via the elastic body 16 interposed therebetween.

The elastic body 16 has a generally truncated conical shape, and is bonded at its central portion to the elastic-body inner metal member 18, which extends through the central portion of the elastic body 16 along the axis of the engine mount 10, in the process of vulcanization of a rubber material to form the elastic body 16. The elastic body 16 is superposed and bonded at its large-diameter outer circumferential surface on and to the tapered cylindrical portion 44 of the elastic-body outer-cylindrical metal member 22, in the above-described vulcanization. Thus, it is formed the first vulcanized product 28 consisting of the elastic body 16, the elastic-body inner metal member 18 and the elastic-body outer-cylindrical member 22. A sealing rubber layer 46 integrally formed with the elastic body 16 coats and is bonded to a substantially entire area of an inner circumferential surface of the cylindrical portion 40 of the elastic body outer cylindrical metal member 22, and extends at its lower end portion to the lower surface of the flange portion 42.

On the other hand, the diaphragm inner metal member 20 as one component of the second integral vulcanized product 32 includes an abutting portion in the form of a disk-shaped portion 48 extending radially outwardly therefrom, and a fixing portion in the form of a boss-shaped projection 50 protruding axially outwardly from the disk-shaped portion 48, as integrally formed parts. The boss-shaped projection 50 has a tapped hole 52, thereby serving as a fixing nut. Thus, the diaphragm inner metal member 20 and the first mounting member 12 are firmly fixed to the power unit of the vehicle by a mounting bolt (not shown) threaded into the tapped hole 52.

Figure 3:
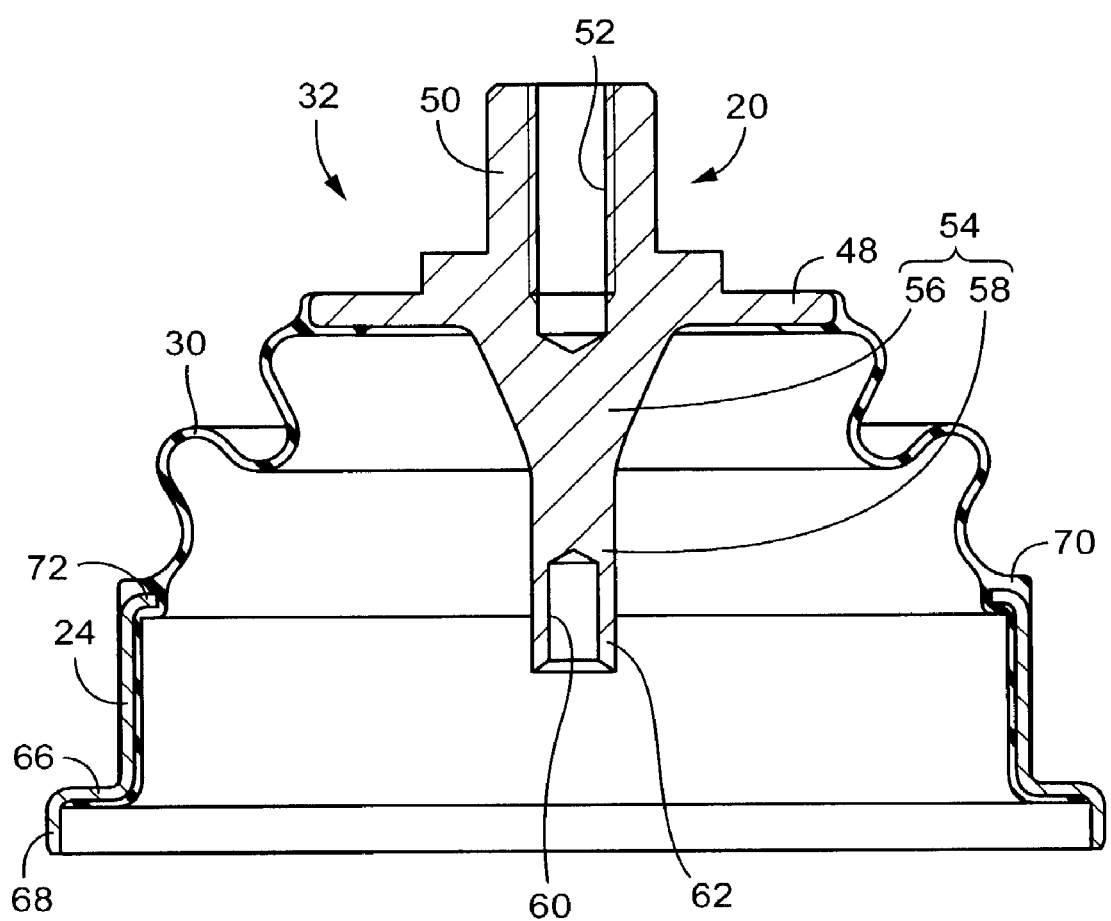
FIG. 3 is an elevational view in vertical cross section of an integral vulcanized product of a flexible diaphragm as a component of the engine mount of FIG. 1.

Further, the diaphragm inner metal member 20 includes a rod shaped fixing shaft 54 integrally formed at its axially intermediate portion so as to protrude axially downwardly. The axially upper portion of the fixing shaft 54 serves as a fitting protrusion in the form of a fitting guide protrusion 56, while the axially lower portion of the fixing shaft 54 serves as a press-fitting portion 58. Described in detail, the fitting guide protrusion 56 includes a tapered outer circumferential surface with an outer diameter gradually decreasing in the axially downward direction from the bottom surface of the disk-shaped portion 48 to the press-fitting portion 58. The fitting guide protrusion 56 has an outer configuration or profile that confirms to an inner surface configuration or profile of the fitting guide recess 36 of the elastic-body inner metal member 18, while having a size that is substantially equal to and slightly smaller than the size of the fitting guide recess 36. On the other hand, the press-fitting portion 58 has a generally circular rod shape and extends axially straightly with a substantially same diameter that is made substantially equal to or slightly smaller than the inner diameter of the fitting bore 38 of the elastic-body inner metal member 18. The fixing shaft 54 includes a recess 60 open in the axially lower end of the fixing shaft 54 and extends in the axial direction with a given axial depth. In the presence of the recess 60, the axially lower end portion of the fixing shaft 54 serves as a calking part 62. FIG. 3 shows a state of the calking part 62 before being calked against the elastic-body inner metal member.

The diaphragm outer-cylindrical metal member 24 has a thin-walled large-diameter cylindrical shape, and includes an annular inward projection 64 integrally formed at its axially upper open end portion so as to slightly protrude radially inwardly, and a flange portion 66 integrally formed at its axially lower open-end portion so as to extend radially outwardly. The protruding end portion of the flange portion 66 is bent axially downwardly, to thereby provide an integrally formed annular fitting surface 68. The diaphragm inner metal member 20 is disposed on the side of the inner projection 64 with an axial and radial spacing therebetween, while being held in coaxial relationship with the inner projection 64. The diaphragm inner metal member 20 and the diaphragm outer sleeve member 24 are elastically connected with each other via the flexible diaphragm 30.

The flexible diaphragm 30 has a generally thin-walled annular plate-like shape, and has a large amount of slag at its central portion for facilitate elastic deformation thereof. In other words, the flexible diaphragm 30 is a bellows-shaped member extending axially outwardly and radially outwardly. The inner peripheral portion of the flexible diaphragm 30 is bonded to an outer circumferential surface of the disk-shaped portion 48 of the diaphragm inner metal member 20 in the process of vulcanization of a rubber material for forming the flexible diaphragm 30. The outer peripheral portion of the flexible diaphragm 30, on the other hand, is bonded to the inward projection 64 of the diaphragm outer cylindrical metal member 24 in the above-described vulcanization. Thus, it is formed the second integral vulcanized product 32 consisting of the flexible diaphragm 30, the diaphragm inner metal member 20 and the diaphragm outer cylindrical metal member 24. A sealing rubber 70 integrally formed with the flexible diaphragm 30 coats and is bonded to a substantially entire area of the inner circumferential surface of the diaphragm outer cylindrical metal member 24, such that an axially upper end portion of the sealing rubber 70 coats entirely the inward projection 64, and an axially lower end portion of the sealing rubber 70 extends to the lower surface of the flange portion 66.

The thus formed second integral vulcanized product 32 is superposed on and assembled with the first integral vulcanized product 28 in the vertical or axial direction, such that the diaphragm inner metal member 20 is fixed to the elastic-body inner metal member 18, and the diaphragm outer cylindrical metal member 24 is fixed to the elastic-body outer-cylindrical metal member 22. In this state, the flexible diaphragm 30 is disposed radially outwardly of the elastic body 16 with a given spacing therebetween, so as to surround an entire outer circumferential surface of the elastic body 16.

That is, the disk-shaped portion 48 of the diaphragm inner metal member 20 is held in close contact with the upper end face of the elastic-body inner metal member 18, and the fitting guide protrusion 56 and the press-fitting portion 58 of the fixing shaft 54 of the diaphragm inner metal member 20 is inserted into and positioned relative to the guide part 36 and the fitting part 38 of the fixing bore 34, respectively, whereby the diaphragm inner metal member 20 and the elastic-body inner metal member 18 are positioned relative to each other in the direction perpendicular to the axial direction thereof. Since the press-fitting portion 58 of the fixing shaft 54 is press-fitted into the fitting part 38 of the fixing bore 34, the elastic-body inner metal member 18 and the diaphragm inner metal member 20 are directly fixed to each other to thereby form the first mounting member 12.

It should be appreciated that the tapered inner surface of the guide part 36 of the fixing bore 34 of the elastic-body inner metal member 18 has a function to guide the fixing shaft 54 into a desired fixing position, when the elastic-body and diaphragm inner metal members 18, 20 are assembled together.

With the elastic-body and diaphragm inner metal members 18, 20 assembled together as described above, the calking part 62 integrally formed at a protruding end portion of the fixing shaft 54 is subjected to a suitable calking operation, thereby being bent radially outwardly and being calked against a peripheral portion of the small diameter end face of the elastic-body inner metal member 18. As a result, the diaphragm inner metallic member 20 is disengageably fixed to the elastic-body inner metal member 18. As is understood from the foregoing description, a fixing mechanism to fix the elastic-body inner metal member 18 and the diaphragm inner metal member 20 together is composed of the press-fitting mechanism provided by the fitting part 38 and the press-fitting portion 58, and the calking mechanism provided by the calking part 62.

On the other hand, the diaphragm outer cylindrical metal member 24 is pushed onto the elastic-body outer-cylindrical metal member 22 in the axially downward direction, to thereby be engaged with the elastic-body outer-cylindrical metal member 22 such that the flange portion 42 of the elastic-body outer-cylindrical metal member 22 is superposed on the flange portion 66 of the diaphragm outer cylindrical metal member 24, while the annular inward projection 64 of the elastic-body outer-cylindrical metal member 22 is superposed on a peripheral portion of the axially upper end face of the elastic-body outer-cylindrical metal member 22.

With the elastic-body and diaphragm outer cylindrical metal members 22, 24 assembled together as described above, the opening of the circumferential groove in the outer circumferential surface of the elastic-body outer-cylindrical metal member 22 is fluid-tightly closed by the diaphragm outer cylindrical metal member 20. Thus, the second mounting member 14 is provided therein with a circumferential passage 72, which is defined by and between the cylindrical wall portion 40 of the elastic-body outer-cylindrical metal member 22 and the diaphragm outer cylindrical metal member 24, and which continuously extends circumferentially by a given circumferential length, or alternatively over an entire circumference of the second mounting member 14. In addition, the rid-metal-plate member 26 having a relatively large diameter disk-like shape is laminated to the lower end face of the elastic body outer metal member 22, to thereby fluid-tightly close an opening of a large diameter recess 73 of the elastic body 16.

The elastic-body and diaphragm outer cylindrical metal members 22, 24, and the rigid metal-plate member 26, which are superposed one another as described above, are fixed together, thereby providing the second mounting member 14. In the present embodiment, these three members 22, 24, 26 are fastened to one another by means of a tubular bracket 74 and a heat shielding sleeve in the form of a tubular stop member 76, both being made of metal, for example.

Specifically, the tubular bracket 74 has a large-diameter round tubular shape, and includes an upper and an lower flange portion 78, 80 that are integrally formed at its axially upper and lower end portions so as to extend radially outwardly. The tubular stop member 76 also has a large-diameter round tubular shape, and includes a calking part 82 integrally formed at its axially lower open-end portion so as to protrude radially outwardly. An axially upper open-end portion of the tubular stop member 76 partially extends axially upwardly, and is bent radially inwardly at its protruding end portion, thereby providing a stop portion 84 as an integral part of the tubular stop member 76. The upper flange portion 78 of the tubular bracket 74 and the calking part 82 of the tubular stop member 76 are assembled with the second mounting member 14 such that the outer peripheral portions of the elastic-body cylindrical metal member 22, the diaphragm cylindrical metal member 24 and the rid-metal-plate member 26 are sandwiched by and between the upper flange portion 78 and the calking part 82 in the axial direction. The calking part 82 is calked against the aforesaid outer peripheral portions of the second mounting member 14 via the tubular bracket 74, whereby the second mounting member 14, the tubular bracket 74, the tubular stop member 76 are fastened together by calking.

The tubular bracket 74, which is assembled at its upper flange portion 78 with the second mounting member 14 as described above, is fixed at its lower flange portion 80 to the body (not shown) of the vehicle, for thereby mounting the second mounting member 14 on the body of the vehicle. The tubular stop member 76 extends axially outwardly along the diaphragm outer-cylindrical metal member 24 such that the stop portion 84 of the tubular stop member 76 is located above and opposed to the disk-shaped portion 48 of the diaphragm inner metal member 20 with an axial spacing therebetween. The stop portion 84 and the disk-shaped portion 48 cooperate to form a stop mechanism in a rebound direction, where the stop portion 84 is brought into abutting contact with the disk-shaped portion 48 via a buffer 86 attached to the disk-shaped portion 48, thereby limiting an amount of axial displacement of the first and second mounting members 12, 14, in the direction in which the first and second mounting members away from each other (i.e., in the rebound direction). Another stop member 90 equipped with a rubber buffer 88 is fixed to the outer circumferential surface of the tubular stop member 76, by means of bolts or the like. This stop member 90 constitutes a stop mechanism in a bound direction. It should be noted that the tubular stop member 76 is disposed radially outwardly of and covers substantially entirely the flexible diaphragm 30, so that the flexible diaphragm 30 is stably protected from possible damages due to undesirable contact with the other components or flying rocks, and due to heat emitted from an internal combustion engine of the vehicle. Although the flexible diaphragm has a relatively small-wall thickness, the tubular stop member 76 ensures an improved durability of the flexible diaphragm in comparison with a conventional fluid-filled vibration-damping device in which a thin-walled flexible diaphragm is directly exposed to the atmosphere and the emissive heat.

With the opening of the recess 73 of the elastic body 16 fluid-tightly closed by the rid-metal-plate member 26, the elastic body 16 and the rid-metal-plate member 26 cooperate to define therebetween a pressure-receiving chamber 92 filled with the non-compressible fluid. The pressure-receiving chamber 92 is partially defined by the elastic body 16. Upon application of vibrational loads between the first and second mounting members 12, 14, the pressure of the fluid in the pressure-receiving chamber 92 changes due to the elastic deformation of the elastic body 16.

In a state where the elastic-body inner metal member 18 and the diaphragm inner metal member 20, as well as while the elastic-body outer-cylindrical metal member 22 and the diaphragm outer cylindrical metal member 24 are fluid-tightly assembled with each other, as described above, the elastic body 16 and the flexible diaphragm 30 are assembled with each other while assuring a fluid-tight sealing both in their inner peripheral portions and their outer peripheral portions. Thus, the elastic body 16 and the flexible diaphragm 30 cooperate to define therebetween an equilibrium chamber 94 filled with the non-compressible fluid. This equilibrium chamber 94 is partially defined by a flexible diaphragm 30, and has a volume that is permitted to vary by displacement of the diaphragm 30. In order to assure an excellent vibration damping effect of the engine mount 10 at a desired frequency band, on the basis of resonance or flows of the non-compressible fluid through a first orifice passage 96, which will be described later, the non-compressible fluid desirably has a viscosity not higher than 0.1 Pa.·s.

The circumferential passage 72 formed within the second mounting member 14 is held in fluid communication with the pressure-receiving chamber 92 through a communication hole 98 formed at one circumferential position thereof, and with the equilibrium chamber 94 through a communication hole 100 as a cutout formed at another circumferential position thereof, and a guide groove 101 open in the outer circumferential surface of the elastic body 18 and contiguous to the communication hole 100. Thus, the circumferential passage 72 serves to provide a first orifice passage 96 permitting flows of the fluid therethrough between the pressure-receiving chamber 92 and the equilibrium chamber 94, and extending circumferentially with a given circumferential length. As well known in the art flows of the fluid through the first orifice passage 96 is caused by the fluid-pressure variation induced between the pressure-receiving chamber 92 and the equilibrium chamber 94 upon application of the vibrational loads. As a result, the engine mount 10 can exhibit a high vibration damping effect with respect to the input vibrational load based on resonance or flows of the fluid through the first orifice passage 96. Frequency characteristics of the vibration damping effect of the engine mount 10 on the basis of the resonance of the fluid through the first orifice passage 96, can be adjusted by tuning a ratio of the cross sectional area to the circumferential length of the first orifice passage 96.

In the engine mount 10 constructed as described above, the elastic-body inner metal member 18 bonded to the elastic body 16 and the diaphragm inner metal member 20 bonded to the flexible diaphragm 30 are superposed on each other and fixed together to form the first mounting member 12. The diaphragm inner metal member 20 has no through hole, and is superposed on the axially upper or outer surface of the elastic-body inner metal member 18. This arrangement eliminates or prevents that the interface between abutting surfaces of the two inner metal members 18, 20 is directly exposed to the atmosphere. Moreover, the peripheral portions of the interface between the abutting surfaces of the two inner metal members 18, 20 are held within the pressure-receiving chamber 92 (see an axially lower end portion of the interface) and the equilibrium chamber 94 (see an outer peripheral portion of the interface). Therefore, the engine mount 10 can fully assure an extremely high fluid-tight sealing at the interfaces between the elastic-body inner metal member 18 and the diaphragm inner metal member 20.

According to the present embodiment, the fixing bore 34 of the elastic-body inner metal member 18 has the guide part 36 having the tapered shape with a diameter gradually increases in the axially upward direction, effectively guiding the fixing shaft 54 of the diaphragm inner metal member 20 upon inserting the fixing shaft 54 into the fixing bore 34, thus facilitating the assembling of the two inner metal members 18, 20.

In the engine mount 10 of the present embodiment, the elastic-body inner metal member 18 and the diaphragm inner metal member 20 are positioned relative to each other in a radial direction perpendicular to the axial direction, by fitting the fixing shaft 54 of the diaphragm inner metal member 20 into the fixing bore 34 of the elastic-body inner metal member 20. Therefore, the two inner metal members 18, 20 can be easily and accurately positioned relative to each other upon assembling thereof, and can be surely prevented from being displaced relative to each other upon application of a vibrational load between the two members 18, 20, in use. Thus, the engine mount 10 is capable of exhibiting a high reliability on a fluid-tight sealing of the non-compressible fluid for a long period of time.

Further, the calking part 62 formed at the protruding end portion of the fixing shaft 54 (or the fitting guide protrusion 56) of the diaphragm inner metal member 20 is fixed by calking to the elastic-body inner metal member 18, making it possible to increase a strength in the assembling of the elastic-body inner metal member 18 and the diaphragm inner metal member in the axial direction.

Figure 2:
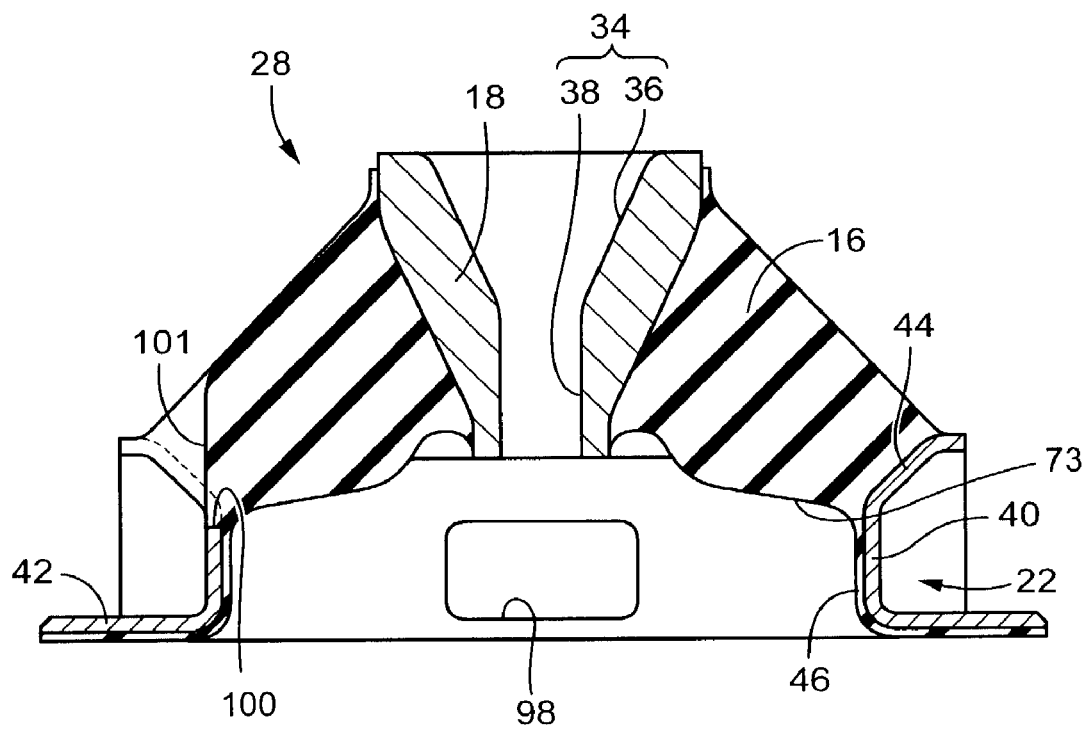
FIG. 2 is an elevational view in vertical cross section of an integral vulcanized product of an elastic body as a component of the engine mount of FIG. 1.

Hereinafter, some of other embodiments of the present invention in the form of engine mounts will be described. The following embodiments are different from the aforementioned embodiment in terms of fixing mechanism for fixing the elastic-body inner metal member 18 and the diaphragm inner metal member 20 together. The same reference numerals as used for the engine mount 10 shown in FIGS. 1 to 3 are used to designate the corresponding elements and parts of the engine mounts according to the following embodiments, and the detailed description thereof is omitted.

Figure 4:
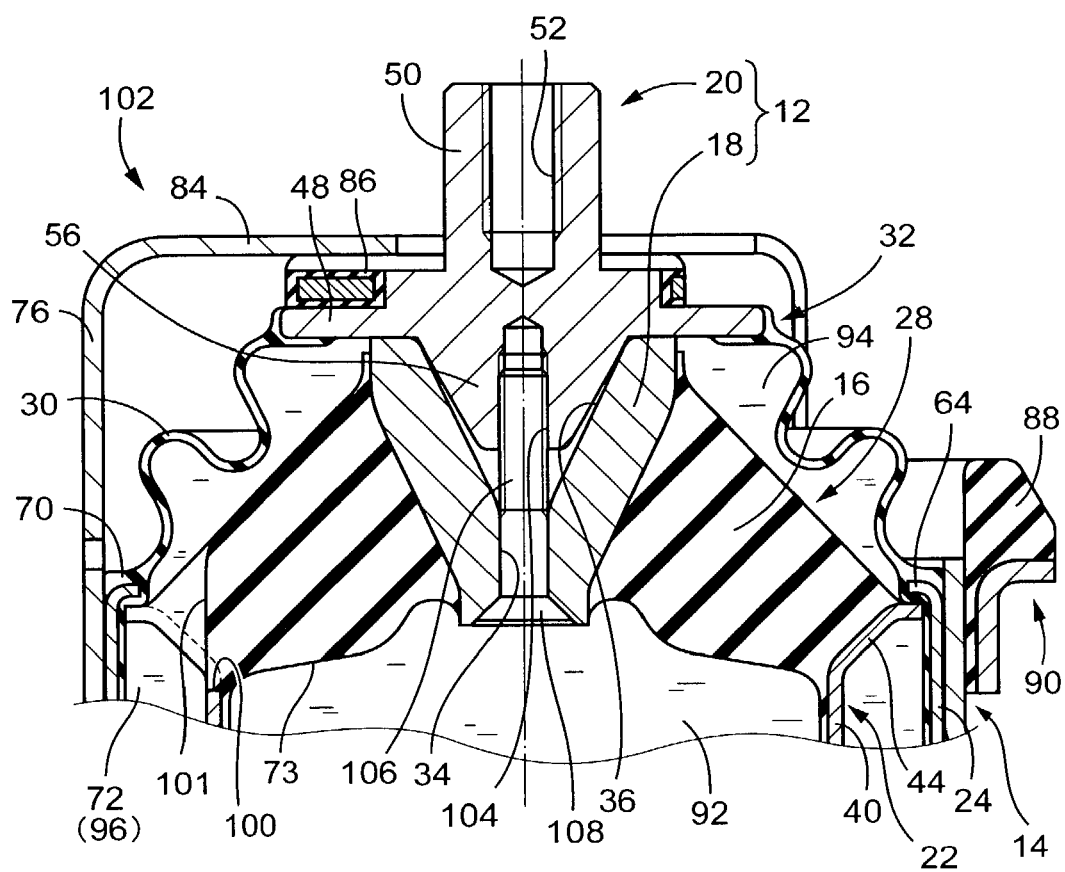
FIG. 4 is a fragmentary view in vertical cross section of an engine mount constructed according to a second embodiment of the present invention, where a principle part of the mount is shown.

Referring next to FIG. 4, a principle part of an engine mount 102 for use in an automotive vehicle is shown as a second embodiment of a fluid-filled vibration-damping device of the present invention. The elastic-body inner metal member 18 of this engine mount 102, has a fitting guide protrusion 56 integrally formed at an axially lower end face thereof. The fixing guide 54 includes the fitting guide protrusion 56 having a generally inverted-frustoconical shape. The fixing guide projection 56 includes a cup shaped tapped hole 104 open in a central portion of its lower end face thereof, rather than the press-fitting portion (58) used in the first embodiment.

In the engine mount 102 of the present invention, the elastic-body inner metal member 18 and the diaphragm inner metal member 20 are positioned relative to each other by fitting the fitting guide protrusion 56 of the diaphragm inner metal member 20 into the guide part 36 of the fixing bore 34 of the elastic-body inner metal member 18. Further, a fixing bolt 106 is inserted into the fixing bore 34 of the elastic-body inner metal member 18 through the tapped hole 104, and is thread-engaged with the tapped hole 104. A disk-shaped tip end portion 108 of the fixing bolt 106 is engaged with the lower end face of the elastic-body inner metal member 18. Therefore, to fasten the fixing bolt 106 makes it possible to apply a relatively large fastening force to the elastic-body inner metal member 18 and the diaphragm inner metal member 20 for thereby moving these two inner metal members 18, 20 to each other in the axial direction. Since a disk-shaped head portion and a leg portion of the fixing bolt 106 are fitting in the fixing bore 34 and a lower end portion of the fixing bore 34, the elastic-body inner metal member 18 and the diaphragm inner metal member 20 is effectively positioned relative to each other in a radial direction perpendicular to the axial direction, like the press-fitting portion (58) of the first embodiment.

That is, the engine mount 102 of the present invention is provided with a fixing mechanism composed of the fixing bolt 106, thus being capable of exhibiting the same effects of the invention, which are described above with respect to the engine mount 10 of the first embodiment. In addition, the engine mount 102 employs a bolt to fasten the elastic-body inner metal member 18 and the diaphragm inner metal member 20 together, rather than a press-fitting operation, thereby facilitating the assembling of the two inner metal members 18, 20.

Figure 5:
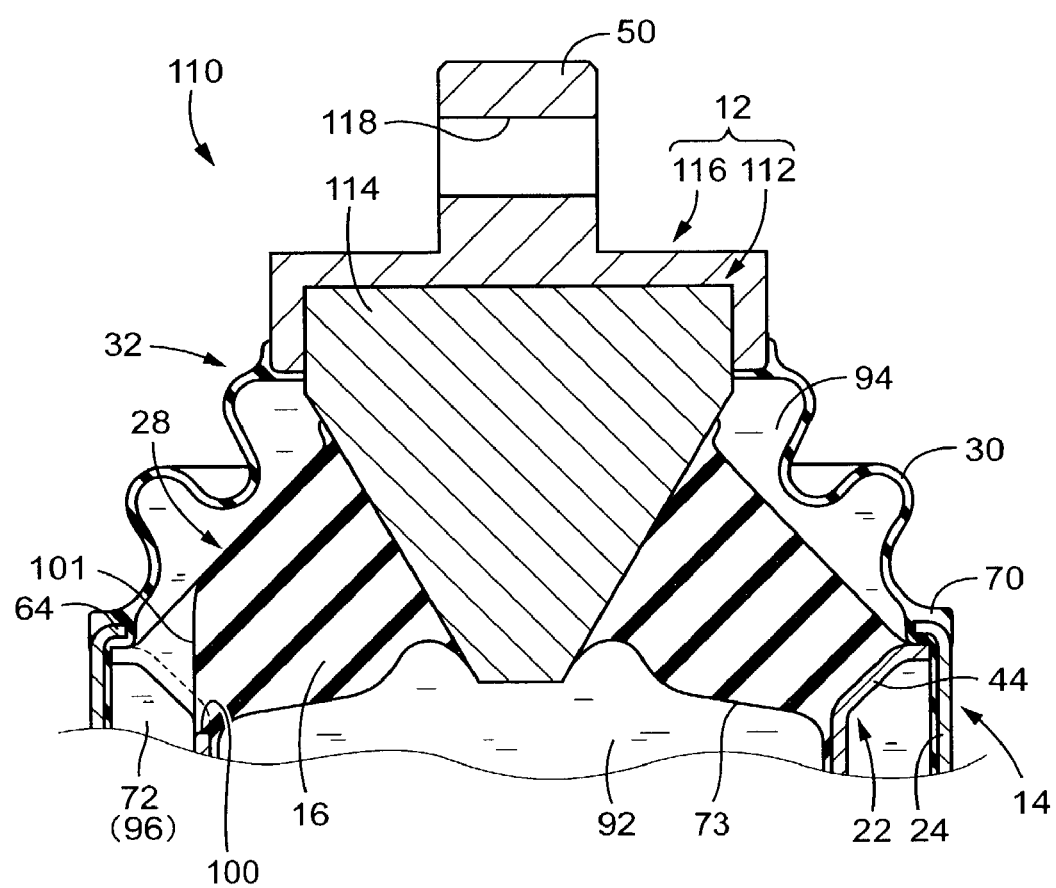
FIG. 5 is a fragmentary view in vertical cross section of an engine mount constructed according to a third embodiment of the present invention, where a principle part of the mount is shown.

Referring next to FIG. 5, there is shown a principle part of an engine mount 110 for use in an automotive vehicle according to a third embodiment of a fluid-filled vibration-damping device of the present invention. The engine mount 110 includes an elastic-body inner metal member 112 that is a solid metal member having an inverted-frustoconical shape in its entirety. The elastic-body inner metal member 112 has a large-diameter upper end portion, which extends in the axial direction with a substantially constant diameter and serves as a press-fitting portion 114. The engine mount 110 further includes a diaphragm inner metal member 116 having an inverted cup shape with a circular cross section and a small depth. The inner peripheral portion of the flexible diaphragm 30 is bonded to the lower end portion of a cylindrical wall portion of the diaphragm inner metal member 116. The press-fitting portion 114 of the elastic body inner metal member 112 is forcedly press-fitted into the cylindrical wall portion of the diaphragm inner metal member 116. As a result, the elastic-body and diaphragm inner metal members 112, 116 are firmly fixed together such that the diaphragm inner metal member 116 covers entirely the press-fitting portion 114 of the elastic-body inner metal member 112. The boss-shaped projection 50 of the diaphragm inner metal member 116 has a horizontally extending mounting hole 118 rather than the tapped hole (52) as in the first embodiment, for attaching the diaphragm inner metal member 116 to a suitable member on the side of the power unit of the vehicle.

Like the aforesaid embodiments, the engine mount 110 constructed according to this embodiment has the same structural feature that the interface between the abutting surfaces of the elastic-body inner metal member 112 and the diaphragm inner metal member 116 is not exposed to the external area but is held within the equilibrium chamber 94. Therefore, the engine mount 110 can exhibit an excellent fluid-tight sealing, like the aforesaid embodiments.

Figure 6:
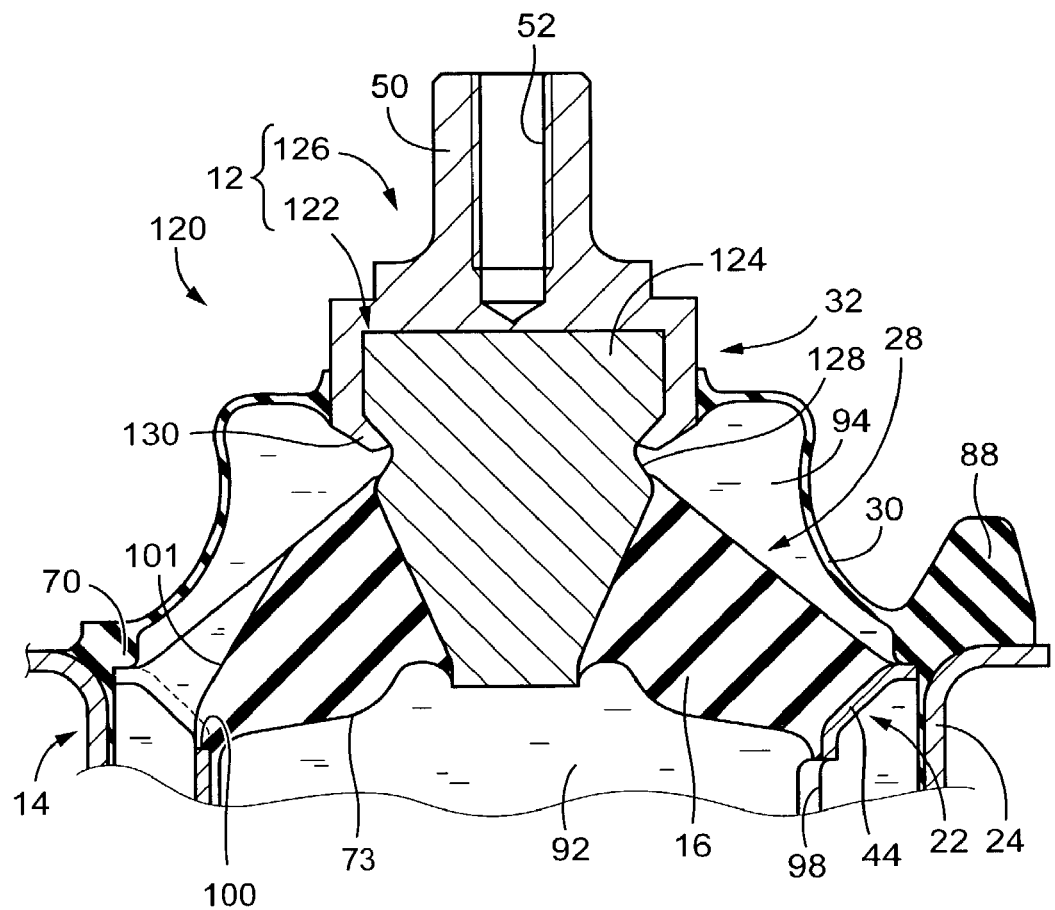
FIG. 6 is a fragmentary view in vertical cross section of an engine mount constructed according to a fourth embodiment of the present invention, where a principle part of the mount is shown.

Referring next to FIG. 6, there is shown a principle part of an engine mount 120 for use in an automotive vehicle constructed according to a fourth embodiment of a fluid-filled vibration-damping device of the present invention. Like the engine mount (110) of the third embodiment, the engine mount 120 includes the elastic-body inner metal member 122 that is a solid metal member having an inverted-frustoconical shape in its entirety and a large-diameter or axially upper end portion extending axially with a substantially same diameter and serving as a press-fitting portion 124 The engine mount 120 also includes a diaphragm inner metal member 126 having an inverted cup shape with a circular cross section and a small depth. The diaphragm inner metal member 126 is forcedly press-fitted onto the press-fitting portion 124, like the engine mount (110) of the third embodiment. In the present embodiment, particularly, the elastic-body inner metal member 122 includes a circumferential constricted part 128 formed at an axially intermediate portion adjacent to the press-fitting portion 124. Therefore, the open end portion of the cylindrical wall of the diaphragm inner metal member 126, which is disposed radially outwardly of the constricted part 128, is radially inwardly drawn or bent onto the constricted part 128, so as to function as an annular engaged part 130 firmly engaged with the constricted part 128.

As is apparent from the foregoing description, the engine mount 110 constructed according to the third embodiment of the present invention can enjoy a further improved bonding force or stability between the elastic-body inner metal member 122 and the diaphragm inner metal member 126 as a result of the engagement between the engaged part 130 and the constricted part 128, in addition to the effects of the present invention as described above with respect to the aforesaid embodiments. That is, the constricted part 128 of the elastic-body inner metal member 122 and the engaged part 130 of the diaphragm inner metal member 126 constitute the fixing mechanism for firmly fixing the elastic-body inner metal member 122 and the diaphragm inner metal member 126 together, in the present embodiment.

Figure 7:
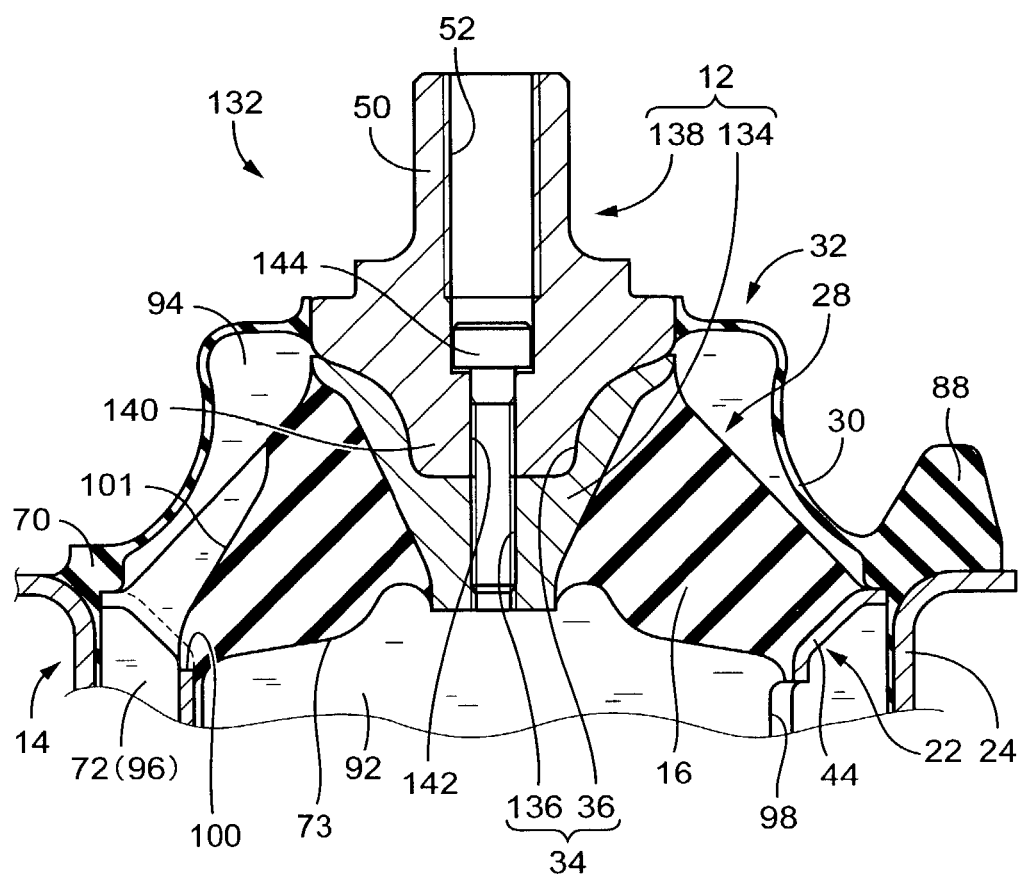
FIG. 7 is a fragmentary view in vertical cross section of an engine mount constructed according to a fifth embodiment of the present invention, where a principle part of the mount is shown.

Referring next to FIG. 7, there is shown a principle part of an engine mount 132 for use in an automotive vehicle constructed according to a fourth embodiment of a fluid-filled vibration-damping device of the present invention. The engine mount 132 includes an elastic-body inner metal member 134 having the fixing bore 34 including the guide part 36 and a tapped part 136, like the engine mount 10 of the first embodiment. Unlike the first embodiment, the fixing bore 34 of the elastic body inner metal member 134 has a tapped part 136 instead of the fixing part (38). The tapped part 136 extends axially downwardly along an central axis of the elastic-body inner metal member 134, and is contiguous to the guide part 36 at its upper end, while being open in the axially lower end face of the inner metal member 134 at its lower end. The axially lower end portion of the diaphragm inner metal member 138 has a generally inverted-frusto-conical shape in its entirety, and serves as a fitting projection 140. The fitting projection 140 is provided with a bolt hole 142 extending therethrough along its central axis and being contiguous to the tapped hole 52 formed through the boss-shaped projection 50.

When the elastic-body inner metal member 134 and the diaphragm inner metal member 138 are assembled together, the fitting projection 140 of the diaphragm inner metal member 138 is forcedly press-fitting into the guide part 36 of the fixing bore 34 of the elastic-body inner metal member 134 so that the two inner metal members 134, 138 are positioned relative to each other. In this state, the fixing bolt 144 is inserted through the bolt hole 142 of the diaphragm inner metal member 138 and thread-engaged with the tapped hole 136 of the elastic-body inner metal member 134. The head of the fixing bolt 144 is engaged or held in abutting contact with the bottom surface of the tapped hole 52 of the diaphragm inner metal member 138. Therefore, by tightening the fixing screw (bolt) 144, a relatively large fastening force acts between the elastic-body inner metal member 134 and the diaphragm inner metal member 138 in the direction in which the two inner metal members 134, 138 are moved to each other.

Like the aforementioned embodiments, the engine mount 132 has the structural feature that the interface between the abutting surfaces of the elastic-body inner metal member 134 and the diaphragm inner metal member 138 is not exposed to the external area, but exposed to within the equilibrium chamber 94, the pressure-receiving chamber 92 and the outer circumferential surface of the fixing bolt 144. This structural feature makes it possible to effectively prevent undesirable leakage of the fluid through the interface between the abutting surfaces of the two inner metal members 134, 138. In addition, the force generated by tightening the fixing bolt 144 directly acts between the elastic-body inner metal member 134 and the diaphragm inner metal member 138 in the direction in which these two members 134, 138 are superposed on each other. This arrangement permits that the two inner metal members 134, 138 are bonded together with a sufficiently large bonding force or strength. Therefore it is possible in the present embodiment to dispose and compress a sealing rubber layer by and between the two members 134, 138, as needed, thus assuring an excellent fluid-tight sealing at the interface between the abutting surfaces of the two inner metal members 134, 138, with ease and efficiency. Moreover, the fixing bolt 144 for use in fastening the elastic-body inner metal member 134 and the diaphragm inner metal member 138 is independent of the mounting bolt for use in attaching the first mounting member 12 to the power unit. For this reasons, the fixing bolt 144 is less likely to be affected by input vibrational load, and can be designed to generate a desired fastening force. Thus, the engine mount 132 of this embodiment can exhibit an excellent fluid-tight sealing in an effective manner.

Figure 8:
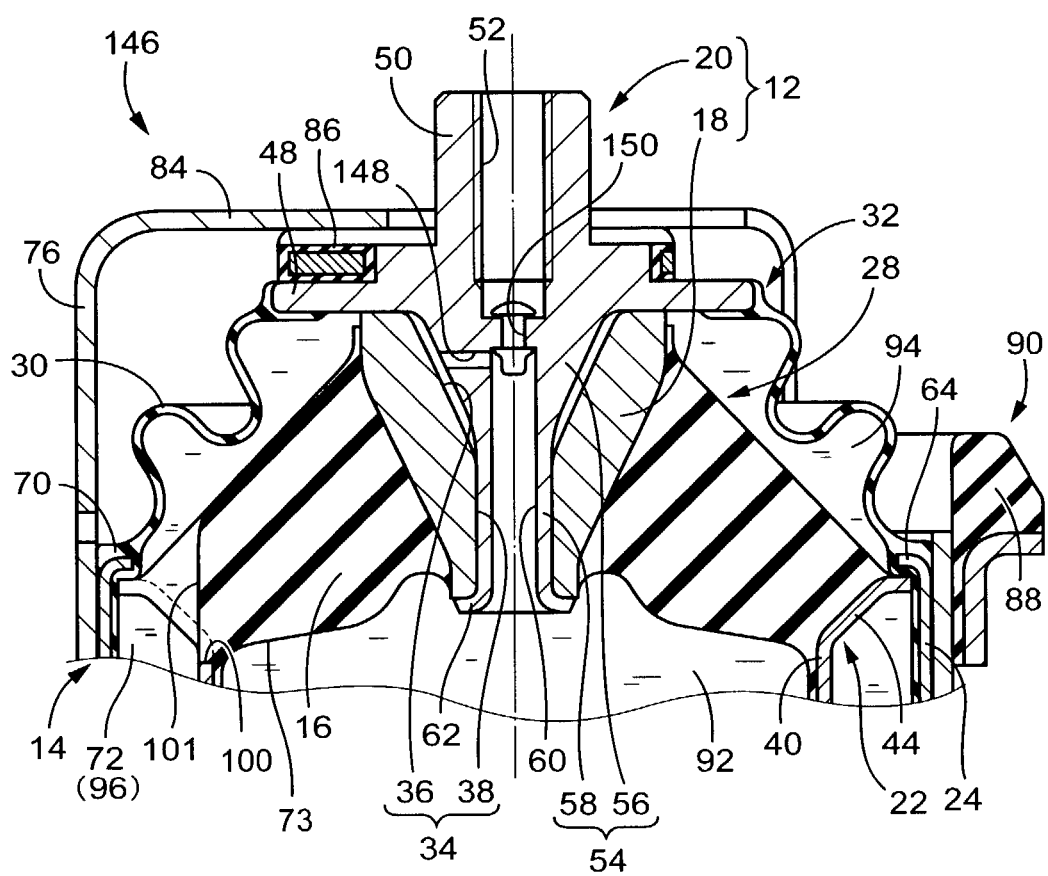
FIG. 8 is a fragmentary view in vertical cross section of an engine mount constructed according to a sixth embodiment of the present invention, where a principle part of the mount is shown.

Referring next to FIG. 8, there is shown a principle part of an engine mount 146 for use in an automotive vehicle constructed according to a fourth embodiment of a fluid-filled vibration-damping device of the present invention. In this engine mount 146, the recess 60 formed in the fixing shaft 54 of the diaphragm inner metal member 20 has a thickness larger than that of the recess 60 in the engine mount 10 of the first embodiment. As shown in FIG. 8, the recess 60 extends axially upwardly so as to be close to the tapped hole 52 of the boss-shaped projection 50. In the present embodiment the fixing shaft 54 of the diaphragm inner metal member 20 has a communication passage 148 as a narrow passage. This communication passage 148 extends in the radial direction perpendicular to the axial direction of the diaphragm inner metal member 20, and is open at one end in the circumferential surface of the recess 60 at an axial position adjacent to the top wall of the recess 60, and at the other end in the outer circumferential surface of the fitting guide protrusion 56. That is, the interface between abutting surfaces of the elastic-body inner metal member 18 and the diaphragm inner metal member 20 is held in communication with the recess 60 through the communication passage 148.

The diaphragm inner metal member 20 further includes an injection bore 150 axially straightly extending through a partition between the tapped hole 52 and the recess 60.

The engine mount 146 of the present embodiment constructed as described above, can exhibit the same effects as described above with respect to the first embodiment. Moreover, the tapped hole 52 formed in the diaphragm inner metal member 20 is connected to a fluid-filled area in the form of the pressure-receiving chamber 92 and the equilibrium chamber 94 through the injection bore 150, in the present embodiment. This arrangement makes it possible to easily fill the fluid-filled area with the non-compressible fluid by injecting the non-compressible fluid through the tapped hole 52 and the injection bore 150, after the execution of a vacuum suction or the like.

The injection bore 150 is also directly connected to the interface between the elastic-body inner metal member 18 and the diaphragm inner metal member 20 through the communication passage 148, making it possible to eliminate or remove the air remained in the interface is an effective manner.

Further, the injection bore 150 for pouring the non-compressible fluid into the fluid-filled area may have a diameter as small as possible, and the opening of the injection bore 150 is fluid-tightly closed by a blind rivet or other suitable sealing members. Thus, the engine mount 146 of the present embodiment can establish a high fluid-tight sealing thereof with ease. When the engine mount 146 is installed on the vehicle, the injection bore 150 is fluid-tightly closed by the mounting bolt thread-engaged with the tapped hole 52 for mounting the first mounting member 12 to the power unit of the vehicle. Therefore, the presence of the injection bore 150 does not cause the problem of leakage of the non-compressible fluid, and assures an excellent fluid-tight sealing thereof.

While the present invention has been described in its presently preferred embodiments, it is to be understood that the invention is not limited to the details of the illustrated embodiment, but may be otherwise modified.

Figure 9:
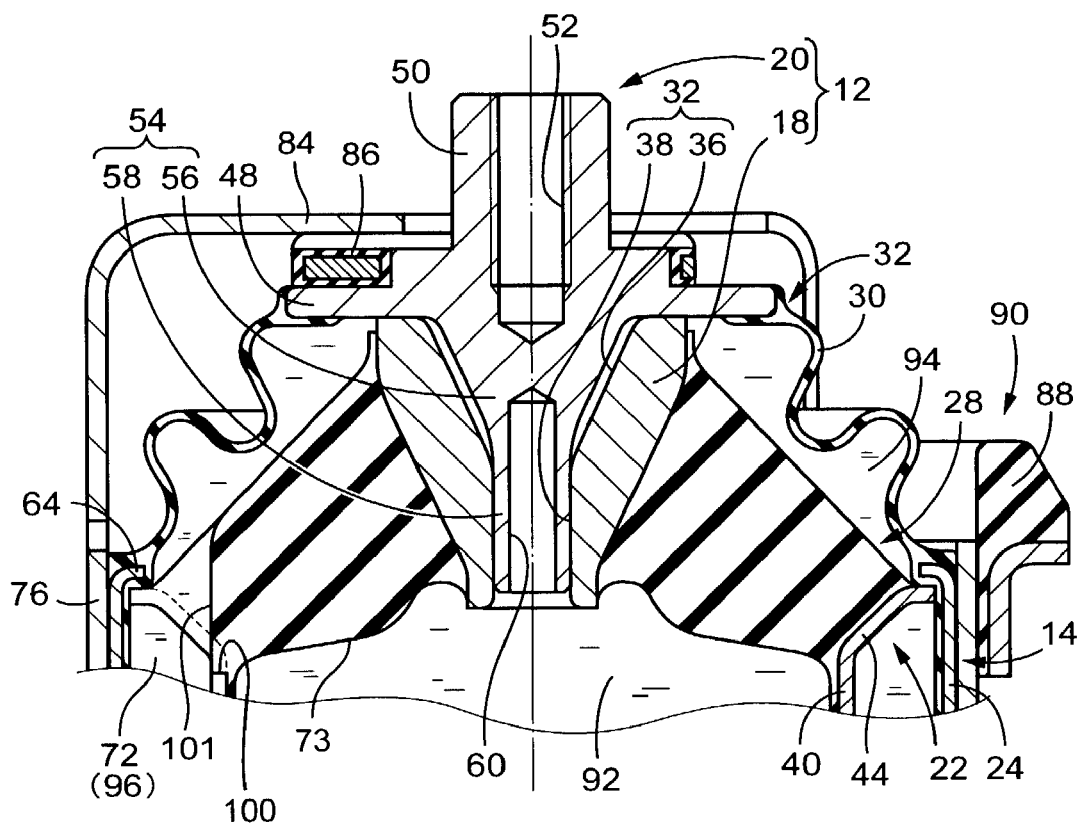
FIG. 9 is a fragmentary view in vertical cross section of an engine mount constructed according to a seventh embodiment of the present invention, where a principle part of the mount is shown.

For instance, it is may be possible to fix the elastic-body inner metal member 18 and the diaphragm inner metal member 20 together by only pressing the press-fitting portion 58 of the diaphragm inner metal member 20 into the guide part 38 of the fixing bore 34 of the elastic-body inner metal member 18, without calking the axially lower end portion of the diaphragm inner metal member 20 against the elastic-body inner metal member 18, as shown in FIG. 9. In FIG. 9, the same reference numerals used for the engine mount 10 shown in FIG. 1 are used to designate the corresponding elements and parts of this engine mount, for the sake of simplicity of ease in understanding the structure of the engine mount.

Figure 10:
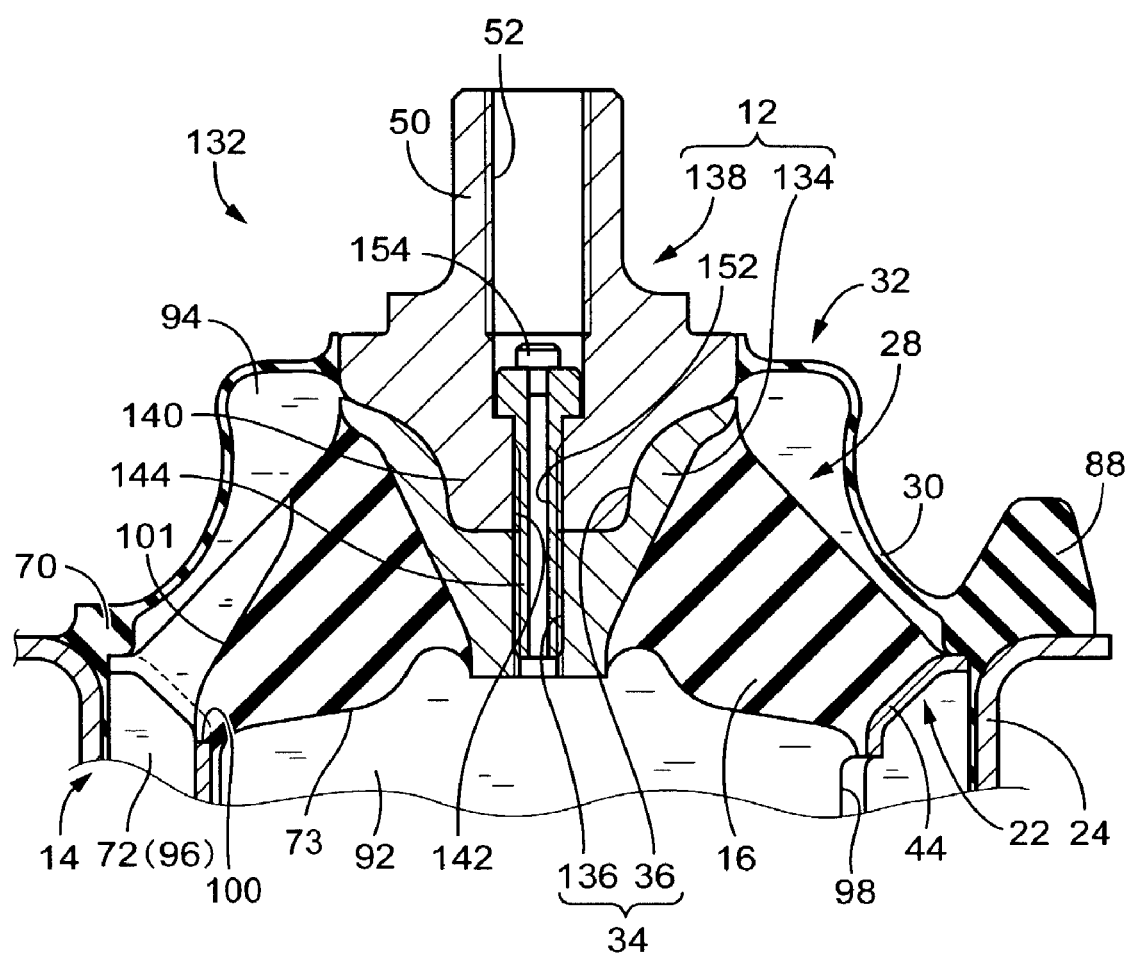
FIG. 10 is a fragmentary view in vertical cross section of an engine mount constructed according to an eighth embodiment of the present invention, where a principle part of the mount is shown.

FIG. 10 shows a modification of the engine mount 132 of the fifth embodiment, in which the fixing bolt 144 is provided with an injection bore 152 extending therethrough along a central axis thereof. This modification makes it possible to pour the non-compressible fluid into the fluid-filled area of the engine mount through the injection bore 152, like in the engine mount 146 constructed according to the sixth embodiment. Like the sixth embodiment, the opening of the injection bore 152 can be fluid-tightly closed by a suitable sealing member 154, thus assuring an excellent fluid-tight sealing. In FIG. 10, the same reference numerals used for the engine mount 10 shown in FIG. 7 are used to designate the corresponding elements and parts of this engine mount, for the sake of ease in understanding the structure of the engine mount.

Figure 11:
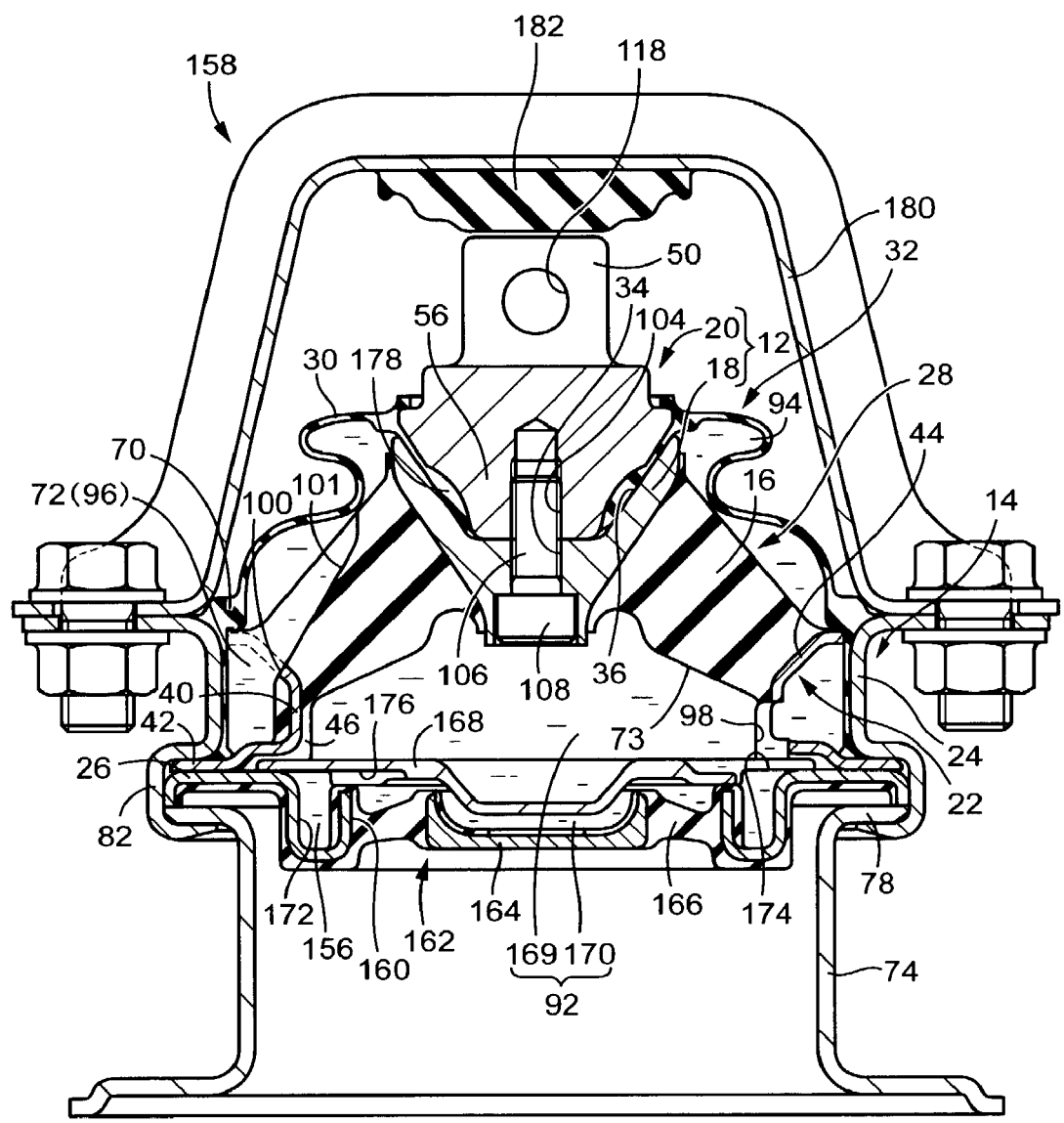
FIG. 11 is an elevational view in vertical cross section of an engine mount constructed according to a ninth embodiment of the present invention.
Figure 12:
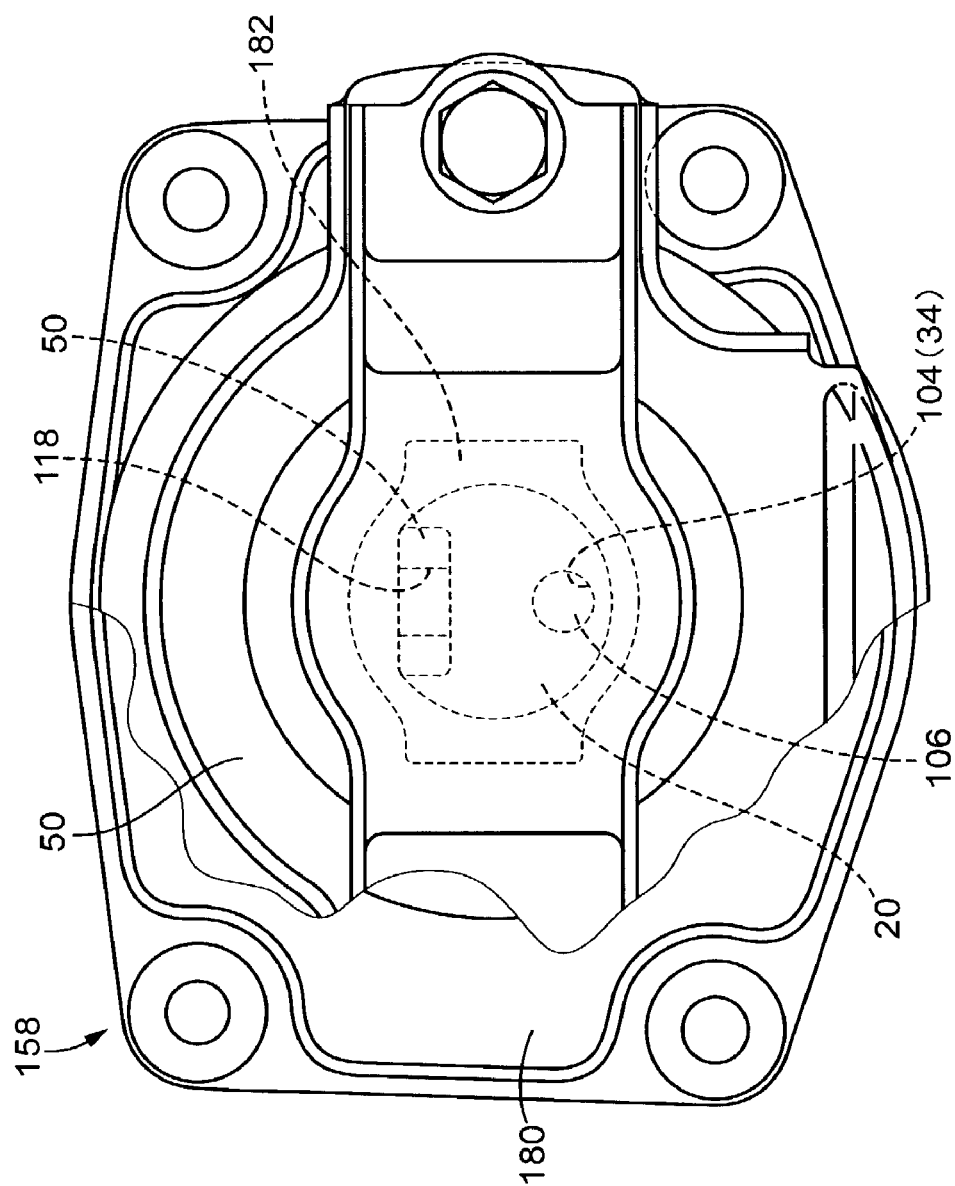
FIG. 12 is a plane view of the engine mount of FIG. 11.

FIGS. 11 and 12 show another embodiment of the present invention in the form of an engine mount 158. The engine mount 158 includes the two mutually independent first and second orifice passages 96 and 156, which are tuned to different frequency ranges. Thus, the engine mount 158 is capable of exhibiting desired vibration damping effects with respect to vibrations having the different frequencies, on the basis of the resonance of the fluid flowing through the two orifice passages 96, 156.

The engine mount 158 is further characterized in that the rid-metal-plate member 26 has a central hole 160 having a relatively large diameter, and a movable member 162 is disposed in the central hole 160 so as to fluid-tightly close this opening 160. The movable member 162 includes a rigid movable plate 164 having a diameter smaller than the diameter of the central hole 160, and an annular rubber support member 166 bonded by vulcanization at its inner peripheral portion to an outer circumferential portion of the movable plate 164 and at its outer peripheral portion to an inner circumferential portion of the rid-metal-plate member 26. That is, the movable plate 164 is elastically supported by the rid-metal-plate member 26 via the rubber support member 166 such that the movable plate 164 is displaceable in the vertical direction as seen in FIG. 11 with the help of the elastic deformation of the rubber support member 166. In addition, the engine mount 158 further includes a metallic partition plate 168 that is interposed between the elastic body 16 and the rid-metal-plate member 26 so as to extend in the direction perpendicular to the axial direction of the engine mount 158. This partition plate 168 is fixed at its peripheral portion to the second mounting member 14 by calking, so that the pressure-receiving chamber 92 is fluid-tightly divided by the partition plate 168 into two parts disposed on the opposite sides of the partition plate 168.

Namely, the pressure-receiving chamber 92 is divided into a primary fluid chamber 169 partially defined by the elastic body 16 and disposed on the upper side of the partition plate 168, and an auxiliary fluid chamber 170 partially defined by the movable member 162 and disposed on the lower side of the partition plate 168. The auxiliary fluid chamber 170 is able to change its volume due to the displacement of the movable member 162. In the present embodiment, the auxiliary fluid chamber 170 has a wall stiffness that is made larger than that of the equilibrium chamber 94. That is, the auxiliary fluid chamber 170 needs larger pressure variation than the equilibrium chamber 94 in order to induce a given amount of volumetric change.

The rid-metal-plate member 26 further includes a circumferential groove 172 extending circumferentially by a given circumferential length along a peripheral portion of the central hole 160, and being open in its upper surface. The opening of the circumferential groove 172 is fluid-tightly closed by the partition plate 168, thereby providing the second orifice passage 156 that is held in fluid communication at one end with the pressure-receiving chamber 92 via the communication hole 174, and at the other end with the auxiliary fluid chamber 170 via the communication hole 176.

In the engine mount 158 constructed as described above, the first orifice passage 96 and the second orifice passage 156 are independent of each other and can be tuned to different frequency range. For instance, the second orifice passage 156 is tuned to a frequency range higher than the frequency range to which the first orifice passage 96 is tuned. As a result, the engine mount 158 can exhibit the desired vibration damping effect with respect to vibrations having a plurality of frequencies or over a wide frequency range, based on resonance of the fluid flowing through the first orifice passage 96, 156.

Meanwhile, the first mounting member 12 of the engine mount 158 has the substantially same structure as in the second embodiment shown in FIG. 4. For this reason, the same reference numerals as used for the engine mount 102 shown in FIG. 4 are used to designate the corresponding elements and parts of the engine mount 158 shown in FIGS. 11 and 12, and the redundant description thereof is omitted. With respect to the first mounting member 12 of the engine mount 158, it should be noted that the a sealing rubber layer 178 integrally formed with the flexible diaphragm 30 is bonded to and interposed between the abutting surfaces between the elastic-body inner metal member 28 and the diaphragm inner metal member 20, thereby improving a bonding strength and a fluid-tight sealing at the interface between the abutting surfaces of the elastic-body inner metal member 18 and the diaphragm inner metal member 20.

Further, the engine mount 158 is different from the engine mount 102 of the second embodiment in that the diaphragm outer-cylindrical member 24 includes a calking part integrally formed at its axially lower end portion, and a rebound stopper 180 having a generally gate shape is bolted to the axially upper end portion of the diaphragm outer-cylindrical member 24. In the presence of the rebound stopper 180, the first mounting member 12 is brought into abutting contact with the rebound stopper 180 via a rubber buffer 182, upon application of a relatively large load to the engine mount 158 in the rebound direction.

Figure 14:
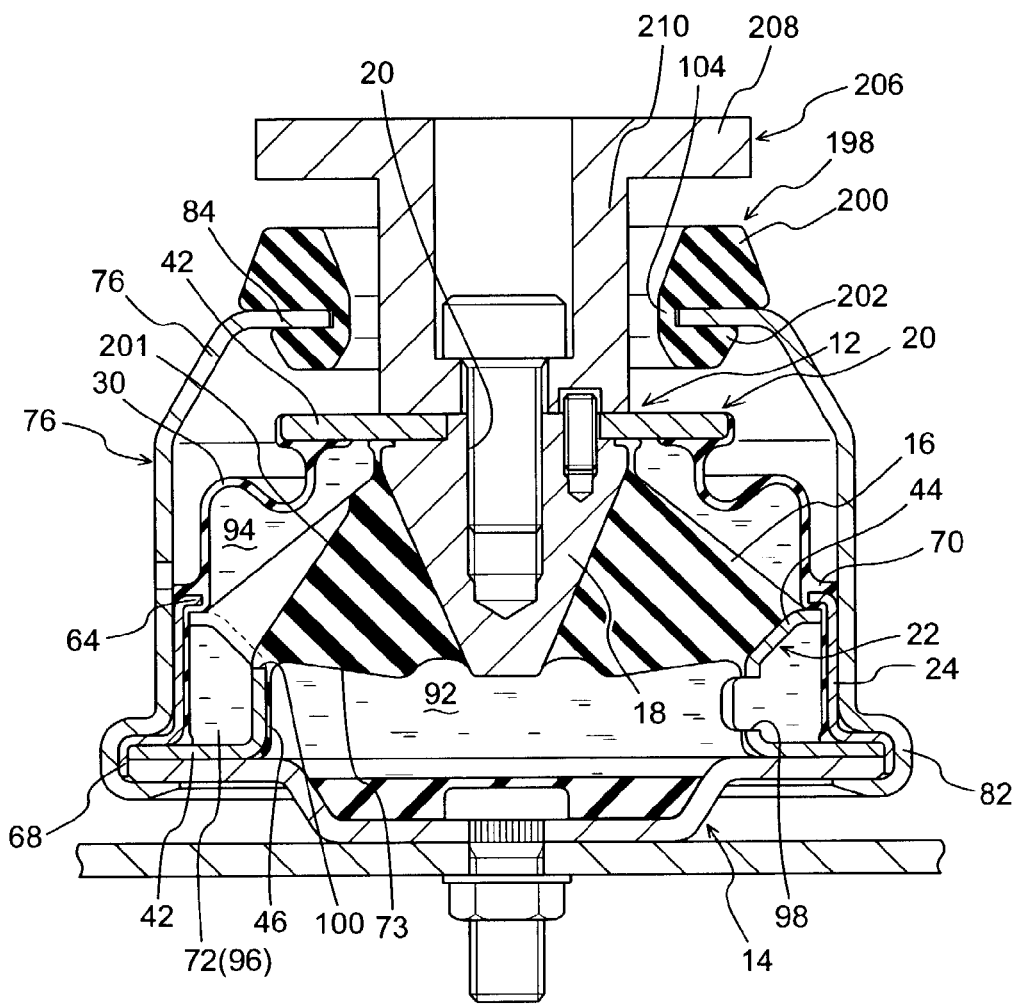
FIG. 14 is an elevational view in vertical cross section of an engine mount constructed according to the present invention wherein further possible modifications are incorporated.

Yet further, the stop portion 84 of the tubular stop member 76 may be provided with a rubber buffer 198 and a slope shaped guide groove 201 as shown in FIG. 14 by way of example. The same reference numerals as used for the aforementioned first embodiment are used to designate the corresponding elements and parts of the engine mounts according to the following embodiments, and the detailed description thereof is omitted in FIG. 14.

Described more specifically, the rubber buffer 198 is bonded to an inner peripheral portion of the stop portion 84 of the tubular stop member 76. The rubber buffer 198 has an annular block shape in its entirety and extends circumferentially with a substantially constant cross sectional shape over an entire circumference of the inner peripheral portion of the stop portion 84. The rubber buffer 198 includes an upper abutting part 200 and a lower abutting part 202 that protrudes from the stop portion in the axially upper and lower directions, respectively, and a circumferential abutting part 204 disposed radially inward of the inner peripheral portion of the stop portion 84 that integrally connects the upper and lower abutting parts 200, 202 to each other. An abutting member 206 is also fixed to the first mounting member 12 by means of a bolt or the like. The abutting member 206 is a hollow cylindrical member having an outward flange portion 208 integrally formed at its axially upper end portion. With the engine mount shown in FIG. 14 installed on the vehicle, the upper abutting part 200 is axially opposed to the outward flange portion 208 with a given spacing therebetween, while the lower abutting part 202 is axially opposed to the disk shaped portion 48 of the diaphragm inner metal member 20 with the given spacing therebetween. The upper abutting part 200 is brought into abutting contact with the outward flange portion 208 of the abutting member 206, thereby limiting an amount of displacement of the first and second mounting members 12, 14 relative to each other in a bound direction, while the lower abutting part is brought into abutting contact with the disk shaped portion 48, thereby limiting an amount of displacement of the first and second mounting members 12, 14 relative to each other in a rebound direction. In addition, the circumferential abutting part 204 of the rubber buffer 198 is brought into abutting contact with a cylindrical wall portion 210 of the abutting member 206 to thereby limit an amount of displacement of the first and second mounting members 12, 14 relative to each other in a radial direction perpendicular to the axial direction of the first and second mounting members 12, 14.

While the guide groove 101 extends in the axial direction in the illustrated embodiment, the guide groove may otherwise be embodied. FIG. 14 shows a guide groove 201 having a sloped shape. Namely, the depth of the guide groove 201 gradually decreases as a distance from the communication hole 100 increases. This arrangement may facilitate smooth flows of the fluid, The elastic body 16 as shown in FIG. 14 may be provided with a cutout having a volume substantially equal to that of the sloped guide groove 201 and formed at a circumferential position that is symmetrical with respect to the central axis of the elastic body 16 to a circumferential position in which the sloped guide groove 201 is formed, or alternatively may be a boss having a volume substantially equal to that of the sloped guide groove 201 and formed on an inner circumferential surface of the elastic body 16 at a circumferential position corresponding to that of the guide groove 201. As a result, the volume of the elastic body 16 is well balanced about the central axis of the elastic body.

Figure 13:
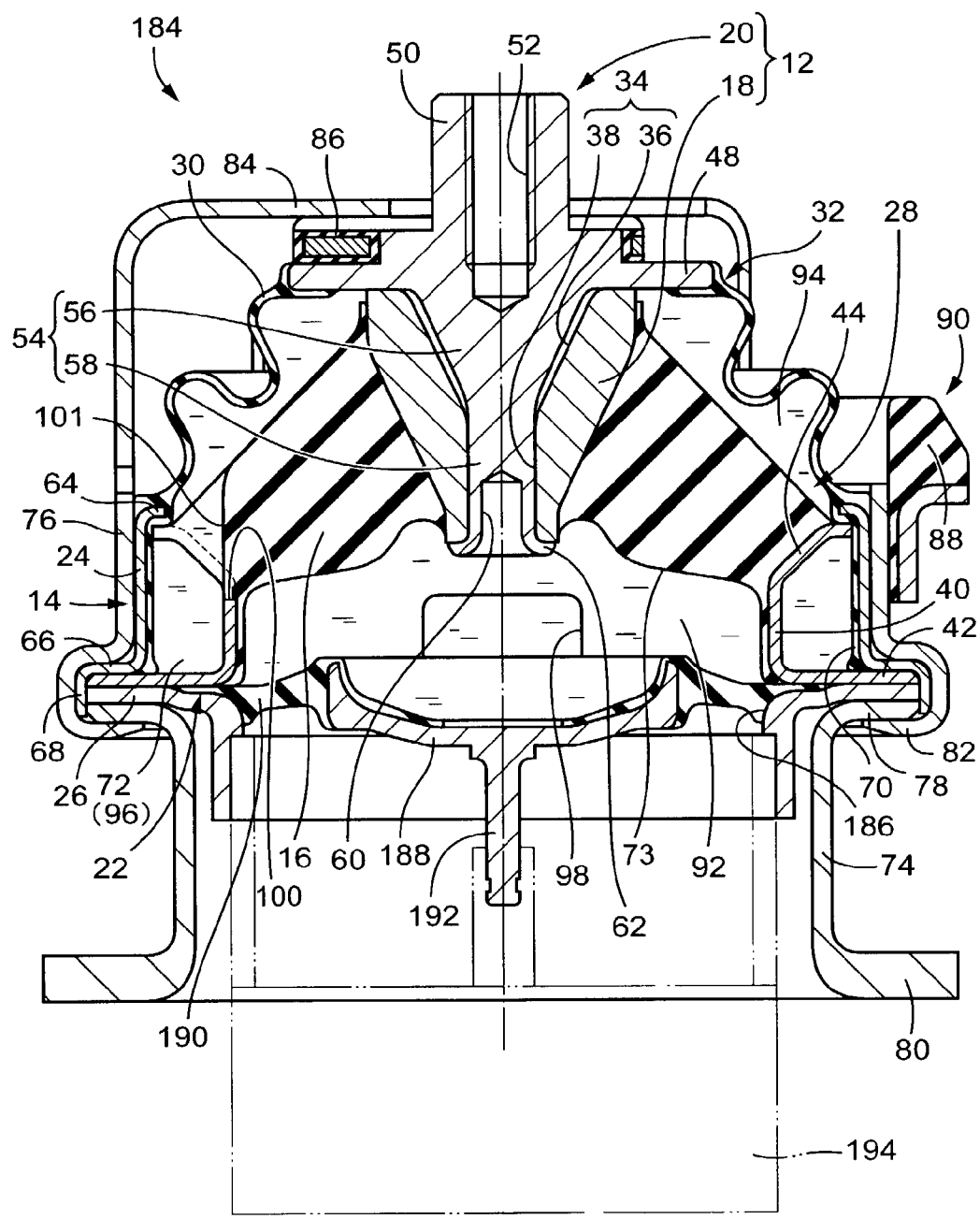
FIG. 13 is an elevational view in vertical cross section of an engine mount constructed according to a tenth embodiment of the present invention.

While the illustrated embodiments of the fluid-filled vibration-damping device of the present invention takes the form of the engine mounts for an automotive vehicle of passive type, for the illustrative purpose only, the principle of the present invention is equally applicable to engine mounts of active type in which the pressure variation induced in the pressure-receiving chamber 92 is actively controlled. FIG. 13 shows one example of an active type engine mount 184 constructed according to the present invention. The engine mount 184 includes an oscillating plate 188 disposed in a central hole 186 formed through the rid-metal-plate member 26, and elastically supported by an annular rubber support member 190 bonded by vulcanization at its inner peripheral portion to the outer circumferential surface of the oscillating plate 188 and at its outer peripheral portion to inner circumferential surface of the rid-metal-plate member 26. Thus, the oscillating member 188 is elastically displaceable in the vertical direction as seen in FIG. 13 owing to the elastic deformation of the rubber support member 190. The oscillating plate 188 has a drive shaft 192 protruding axially downwardly from the central portion of its lower surface. The drive shaft 192 is connectable to an output shaft of a suitable actuator 194 depicted in FIG. 13 by two-dot chain line. The actuator 194 may be desirably selected from various kinds of actuators including a pneumatic type and an electromagnetic type. In operation, the oscillating plate 188 is oscillated by an actuator 192 at a frequency and a phase corresponding to that of the vibrations applied to the engine mount 184, whereby the engine mount 184 can exhibit actively controlled damping effect. It should be appreciated that the active type engine mount 184 constructed as described above according to the invention, can enjoy the same effects of the invention described above with respect to the aforesaid embodiment, likewise.

While the illustrated embodiments of the fluid-filled vibration-damping device of the present invention takes the form of the engine mounts for an automotive vehicle, by way of example, the principle of the present invention is equally applicable to various other types of engine mount, a body mount, a member mount for use on a motor vehicle, and other fluid-filled vibration-damping devices for use in various devices other than those for the automotive vehicle.

It is also to be understood that the present invention may be embodied with various other changes, modifications and improvements, which may occur to those skilled in the art, without departing from the spirit and scope of the invention defined in the following claims.

What is claimed is:

1. A fluid-filled vibration-damping device for connecting two members in a vibration damping fashion, comprising:

a first mounting member connectable to one of the two members;

a second mounting member connectable to an other of the two members;

an elastic body bonded at a central portion thereof to said first mounting member and at an outer circumferential portion thereof to said second mounting member in a process of vulcanization of a rubber material for forming said elastic body, for elastically connecting said first and second mounting members;

a pressure-receiving chamber disposed on one of axially opposite sides of said elastic body, filled with a non-compressible fluid and partially defined by said elastic body, to which a vibrational load is applied;

a flexible rubber layer disposed on an other one of said axially opposite sides of said elastic body so as to form an equilibrium chamber between said flexible rubber layer and said elastic body, said equilibrium chamber being filled with said non-compressible fluid and partially defined by said flexible rubber layer so as to easily permit a volumetric change thereof; and a first orifice passage for fluid communication between said pressure-receiving chamber and said equilibrium chamber;

wherein said first mounting member includes an elastic-body central member bonded to said central portion of said elastic body, and a rubber-layer central member bonded to a central portion of said flexible rubber layer and having a fixing portion at which said first mounting member is connected to the one of the two members, and said elastic-body central member and said rubber-layer central member are superposed on and fixed to each other at their abutting surfaces by means of a fixing mechanism, to thereby constitute said first mounting member, wherein one of said elastic-body central member and said rubber-layer central member has a fitting recess open in said abutting surface thereof, and an other one of said elastic-body central member and said rubber-layer central member has a fitting protrusion formed on said abutting surface thereof and being fitted into said fitting recess so that said elastic-body central member and said rubber-layer central member are positioned relative to each other, and wherein an interface between said abutting surfaces of said elastic-body central member and said rubber-layer central member has a first peripheral portion entirely facing said equilibrium chamber and a second peripheral portion entirely facing said pressure-receiving chamber.

2. A fluid-filled vibration-damping device according to claim 1, wherein said fitting recess has an inner circumferential surface with a tapered shape that corresponds to a tapered shape of an outer circumferential surface of said fitting protrusion.

3. A fluid-filled vibration-damping device according to claim 2, wherein said fitting recess includes a press-fitting hole formed in a bottom wall thereof so as to axially extend with a substantially constant inner diameter, while said fitting protrusion includes a press-fitting part integrally formed at a protruding end portion thereof, said press-fitting part being press-fitted into said press-fitting hole to thereby provide said fixing mechanism.

4. A fluid-filled vibration-damping device according to claim 1, wherein said elastic-body central member includes a fixing bore open in said abutting surface thereof and extending therethrough in a direction in which said elastic-body central member and said rubber-layer central member are superposed on each other, while said rubber-layer central member includes a fixing shaft protruding therefrom, said fixing shaft extending through said fixing bore and disengageably fixed at a tip end thereof to said elastic-body central member, to thereby provide said fixing mechanism.

5. A fluid-filled vibration-damping device according to claim 1, further comprising: an elastic-body outer sleeve member bonded to an outer circumferential portion of said elastic body; and a rubber-layer outer sleeve member bonded to an outer circumferential portion of said flexible rubber layer, wherein said elastic-body and rubber-layer outer sleeve members are fixed together to partially constitute said second mounting member, and cooperate with each other to at least partially define said first orifice passage therebetween.

6. A fluid-filled vibration-damping device according to claim 1, further comprising a narrow passage adapted to connect said interface between said abutting surfaces of said elastic-body central member and said rubber-layer central member to at least one of said equilibrium chamber and said pressure-receiving chamber.

7. A fluid-filled vibration-damping device according to claim 1, wherein said first mounting member includes an injection bore extending through said elastic-body and rubber-layer central members in a direction in which said central members are superposed on each other, and an opening of said injection bore is fluid-tightly closed by a sealing member after filling said device with said non-compressible fluid through said injection bore.

8. A fluid-filled vibration-damping device according to claim 1, further comprising:

a heat shielding sleeve disposed radially outwardly of said flexible rubber layer and fixed at one of axially opposite end portions thereof to said second mounting member, wherein an other one of said axially opposite end portions of said heat shielding sleeve extends radially inwardly so as to provide a stop portion that is opposed to said first mounting member with a given spacing in an axial direction of said device and/or a radial direction perpendicular to said axial direction, and said stop portion is brought into abutting contact with said first mounting member via a buffer so as to limit an amount of displacement of said first and second mounting members relative to each other.

9. A fluid-filled vibration-damping device according to claim 8, further comprising: an elastic-body outer sleeve member bonded to an outer circumferential portion of said elastic body; and a rubber layer outer sleeve member bonded to an outer circumferential portion of said flexible rubber layer, said elastic-body and rubber-layer outer sleeve members being fixed together to partially constitute said second mounting member, wherein said rubber-layer central member extends radially outwardly from said elastic-body central member so as to provide an abutting portion that is brought into abutting contact with said stop portion of said heat shielding sleeve in said axial direction of said device, and said flexible rubber layer is bonded at said central portion thereof to said abutting portion of said rubber-layer central member, while said one of axially opposite end portion of said heat shielding sleeve is mounted on an outer circumferential surface of said rubber-layer outer sleeve member, and is fixed to said second mounting member by calking.

10. A fluid-filled vibration-damping device according to claim 9, further comprising a sealing rubber integrally formed at an outer peripheral portion of said flexible rubber layer over an entire circumference thereof so as to prevent entry of water into an interface between said heat shielding sleeve and said rubber-layer outer sleeve member.

11. A fluid-filled vibration-damping device according to claim 8, wherein said second mounting member has a tapered cylindrical portion formed at one of axially opposite end portions thereof and extending axially outwardly and radially outwardly, and said outer circumferential portion of said elastic body is bonded to said tapered cylindrical portion, and wherein said tapered cylindrical portion is provided with a cutout, while said elastic body is provided with a guide groove formed at a first circumferential position thereof so as to be contiguous with said cutout and so as to extend to said equilibrium chamber so that said cutout and said guide groove cooperate to connect said first orifice passage to said equilibrium chamber.

12. A fluid-filled vibration-damping device according to claim 11, wherein said guide groove has a sloped shape in which a depth dimension gradually decreases with an increase of a distance from said cutout.

13. A fluid-filled vibration-damping device according to claim 1, further comprising: a movable member partially defining said pressure-receiving chamber and being elastically supported by said second mounting member so as to be displaceable relative to said second mounting member; and an oscillating mechanism adapted to apply an oscillating force to said movable member in order to actively induce a fluid-pressure variation in said pressure-receiving chamber.

* * * * *